(12) United States Patent
Wu et al.

(10) Patent No.: US 12,313,595 B2
(45) Date of Patent: May 27, 2025

(54) APPARATUS, SYSTEMS AND METHODS FOR PIPELINE CONDITION ASSESSMENT

(71) Applicant: Pure Technologies U.S. Inc., Columbia, MD (US)

(72) Inventors: Angie Wu, Calgary (CA); Hongwei Zhang, Calgary (CA); Leo Liu, Calgary (CA); Jeffrey Chak-Fai Kwan, Calgary (CA)

(73) Assignee: Pure Technologies U.S. Inc., Columbia, MD (US)

(*) Notice: Subject to any disclaimer, the term of this patent is extended or adjusted under 35 U.S.C. 154(b) by 279 days.

(21) Appl. No.: 18/066,611

(22) Filed: Dec. 15, 2022

(65) Prior Publication Data
US 2023/0221284 A1 Jul. 13, 2023

Related U.S. Application Data

(60) Provisional application No. 63/289,833, filed on Dec. 15, 2021.

(51) Int. Cl.
| | | |
|---|---|---|
| *G01N 29/00* | (2006.01) | |
| *G01N 29/04* | (2006.01) | |
| *G01N 29/22* | (2006.01) | |
| *G01N 29/265* | (2006.01) | |

(52) U.S. Cl.
CPC ......... *G01N 29/041* (2013.01); *G01N 29/223* (2013.01); *G01N 29/265* (2013.01); *G01N 2291/0234* (2013.01); *G01N 2291/0289* (2013.01); *G01N 2291/044* (2013.01); *G01N 2291/106* (2013.01); *G01N 2291/2634* (2013.01)

(58) Field of Classification Search
CPC .. G01N 29/041; G01N 29/223; G01N 29/265; G01N 2291/0234; G01N 2291/0289; G01N 2291/044; G01N 2291/106; G01N 2291/2634; G01N 29/0618; G01N 29/225; G01N 29/227; G01N 29/262; G01N 2291/2636; G01S 15/8915; F16L 55/40; F16L 2101/30
See application file for complete search history.

(56) References Cited

U.S. PATENT DOCUMENTS

| | | | |
|---|---|---|---|
| 2003/0136195 A1* | 7/2003 | Krieg | G01N 29/341 73/628 |
| 2008/0276724 A1* | 11/2008 | Straub, Jr. | G01F 1/662 73/861.18 |
| 2013/0025370 A1* | 1/2013 | Herron | F16L 55/28 73/592 |
| 2020/0049302 A1* | 2/2020 | Paulson | G01N 27/87 |

(Continued)

OTHER PUBLICATIONS

International Search Report; International Cooperation Treaty; application No. PCT/CA2022/051836, 6 pgs.

*Primary Examiner* — Francis C Gray
(74) *Attorney, Agent, or Firm* — Stanek Lemon Crouse & Meeks, PA

(57) ABSTRACT

Apparatus, systems, and methods for pipeline condition assessment using phased array ultrasonic transducers are disclosed. A sensing module for assessing pipeline condition comprises a body; and one or more phased array ultrasonic transducers (PAUTs) assembled on the surface of the body, each PAUT configured to emit multi-channel ultrasonic waves for scanning a pipe wall.

20 Claims, 30 Drawing Sheets

(56) References Cited

U.S. PATENT DOCUMENTS

| | | | |
|---|---|---|---|
| 2021/0046507 A1* | 2/2021 | Chen | H10N 30/88 |
| 2021/0105405 A1* | 4/2021 | Robinson | G01S 15/8915 |
| 2021/0156996 A1* | 5/2021 | Augenstein | G01N 29/2462 |
| 2021/0372970 A1* | 12/2021 | Kwan | G01N 29/265 |

* cited by examiner

APPARATUS, SYSTEMS AND METHODS FOR PIPELINE CONDITION ASSESSMENT

CROSS-REFERENCE TO RELATED APPLICATIONS

The present application claims priority over the U.S. provisional application No. 63/289,833, entitled "APPARATUS, SYSTEMS AND METHODS FOR PIPELINE CONDITION ASSESSMENT USING PHASED ARRAY ULTRASONIC TRANSDUCERS", filed on Dec. 15, 2021, the content of which is hereby incorporated by reference in this disclosure in its entirety.

FIELD

The present application relates to pipeline defect detection, in particular, to apparatus, systems and methods for pipeline condition assessment.

BACKGROUND

Assessing the condition of large diameter metallic water and wastewater pipelines ranging from 48 in and above have been a challenge using existing condition assessment devices utilizing electromagnetic (EM) and magnetic flux leakage (MFL) technology. Such devices often require dewatering and full diameter access for inspection, and have issues traversing inline pipeline features such as butterfly valves, plug valves, bends, wyes and tees. Devices utilizing electromagnetic may not have the signal penetration strength in order to collect accurate wall thickness data in larger diameter pipelines.

SUMMARY

In an embodiment, a flexible pipeline inspection device carried by the liquid of the pipeline includes multiple phased array ultrasonic transducers (PAUTs) for pipeline condition assessment. Using phased array ultrasonic transducers (PAUTs) allows for a more compact sensing module due to the further allowable distance between the sensing module and the pipe wall. This allows for an overall compact and simplified device which allows the device to access and traverse existing pipeline features with ease, and with little to no modification to existing infrastructure to conduct the inspection.

Using the PAUT on the device allows to steer the acoustic beam in various directions. This allows the sensing module to collect wall condition assessment of pipes that are out-of-round (OOR) which may be an existing condition of the pipeline especially in larger pipes due to deformation over time from earth cover. The alternative use of single element ultrasonic transducers will have challenges with collecting data from OOR pipes due to the reflected signal returning on a significant angle that may not return to the sensing module for recording. When using a phased array ultrasonic transducer, the acoustic beam is steered such that the beam arrives at the OOR pipe wall at an angle which allows the reflected signal to return to the sensing module to record the data at that specific location along the pipeline. Thus, when multiple PAUTs are strategically placed around the sensing module, multiple acoustic beams can be fired at multiple angles per PAUT to collect multiple points of data around the circumference of the pipe at a specific location along the pipeline. As the device traverses the pipe, the condition of the pipe along that section can be collected and stored by the device. The data recorded can reveal areas of wall thinning and defects, liner delamination and OOR measurements along the inspected pipeline providing vital information for the pipeline owner to make decisions and extend the life of existing pipeline infrastructure.

As well, using the PAUT allows for a greater tolerance for the sensing module to be out-of-center relative to the pipe as the device traverses the pipeline while still collecting valid data. This is beneficial for the dynamics of the device as centering the device in an OOR pipe can be challenging due to the constant geometry variations between the pipe ends and the middle of the pipe and from pipe to pipe. This is especially important for a petal supported compact structure that is the Pipe diver product platform.

In an aspect, a sensing module for assessing pipeline condition comprises a body; and one or more phased array ultrasonic transducers (PAUTs) assembled on the surface of the body, each PAUT configured to emit multi-channel ultrasonic waves for scanning a pipe wall.

In another aspect, in the sensing module of the preceding aspect, the ultrasonic wave generated by at least one of the one or more PAUTs may partially overlap with the ultrasonic wave generated by an adjacent PAUT.

In another aspect, at least one or the one or more PAUTs comprises:
a matching layer;
a backing layer;
a sensor placed between the matching layer and the backing layer for generating the multi-channel ultrasonic waves;
an outer shell; and
a back shell removably connected to the outer shell for water tightly enclosing the sensor and the matching layer and the backing layer within the outer shell and the back shell.

In another aspect, the at least one or the one or more PAUTs comprises an O-ring between the back shell and the outer shell.

In another aspect, the back shell and the outer are made from plastic.

In another aspect, the plastic comprises polyetheretherketone (PEEK).

In another aspect, the ultrasonic waves generated by at least one of the one or more PAUTs at least partially overlaps on the pipe wall with the ultrasonic waves generated by an adjacent PAUT.

In another aspect, the body comprises a guard including one or more watertight sockets, and wherein each socket is configured to receive one PAUT.

In another aspect, the body comprises a plurality of air bleed holes.

In another aspect, each of the one or more PAUTs comprises a cable and connector for connecting the each of one or more PAUTs to the sensing sensor.

In another aspect, each of the one or more PAUTs comprises a connector for connecting the each of one or more PAUTs to the sensing sensor.

In another aspect, the sensing module further comprises circuits for collecting voltage, current, humidity, pressure and Internal Measurement data of the sensing module.

In another aspect, the sensing module further comprises a removable data storage medium.

In another aspect, the pipe wall is an out-of-round (OOR) pipe wall.

In another aspect, the sensor is a multi-channel piezo ceramic sensor.

In another aspect, the one or more PAUTs are equally space on the body.

In another aspect, a sensing module for assessing pipeline condition, comprising:
- a plurality of pre-loaded spring arms;
- a transducer mounted at an end of each of the plurality of pre-loaded spring arms that deploy in a fully open position when the sensing module is centered in a pipe, wherein each transducer is configured emit an ultrasonic wave for scanning a pipe wall of the pipe, and wherein a first ultrasonic wave emitted from a first transducer is configured to overlap at least a portion of a second ultrasonic wave emitted from an adjacent second transducer.

In another aspect, the each transducer is configured to be equally spaced around the circumference of the pipe and are axially shifted.

In another aspect, the sensing module is configured to collapse when the sensing module passes through a pipe feature.

In another aspect, a device for assessing pipeline condition, comprising:
- a sensing module according to any one of the preceding aspects;
- one or more battery modules for powering the sensing module; and
- one or more sets of supporting structure for maintaining the sensing module at a center of the pipe.

In another aspect, each of the one or more sets of supporting structure comprises a plurality of pre-loaded spring supporting petals.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
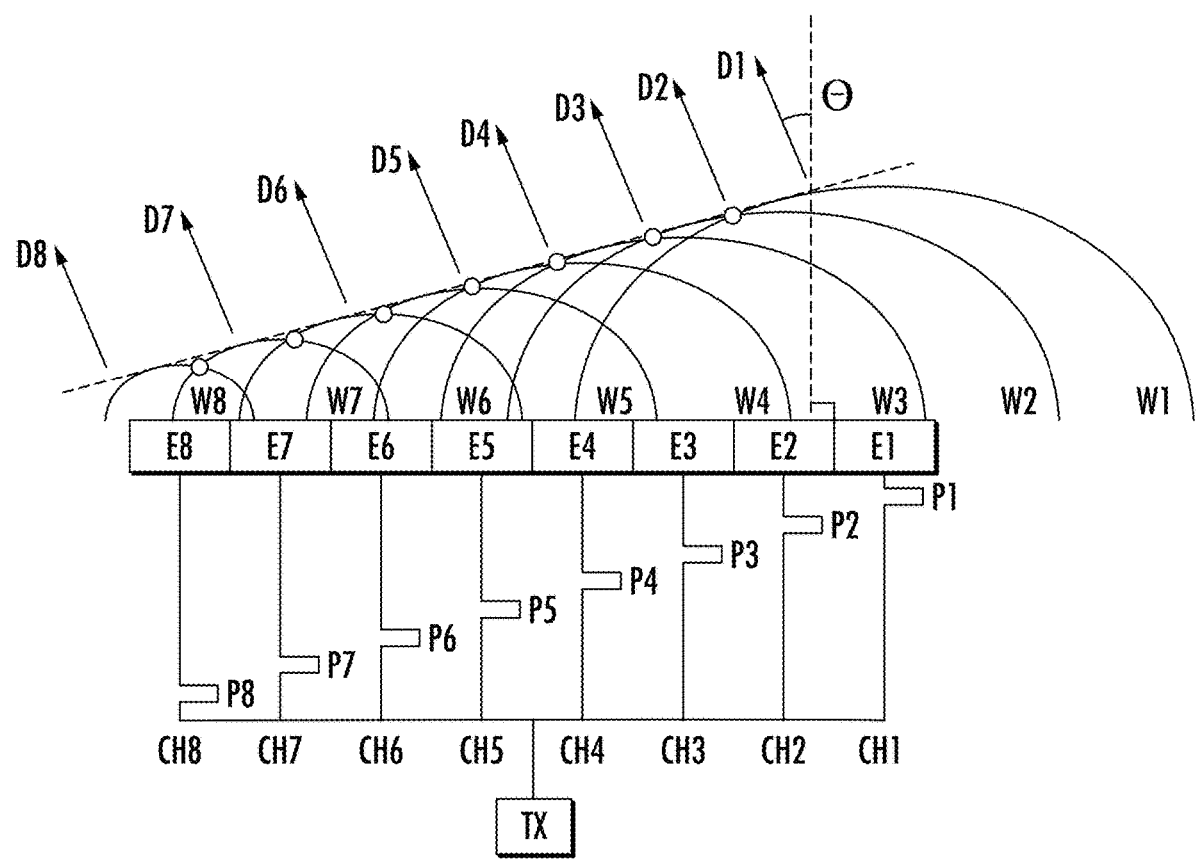
FIG. 1 is a diagram showing multi-channel phased array ultrasonic transducer (PAUT) acoustic wave projection, according to an embodiment.

A phased array ultrasonic transducer (PAUT) is a multi-channel transducer which can generate a steerable pulse off the axis of the transducer at a desired frequency with the use of delayed pulses as shown in FIG. 1. By varying the timing delay between the pulses of each channel, the steering angle can be changed to the desired direction.

In the example of FIG. 1, a PAUT include a beamforming oscillator (TX) or a signal source that produces an electronic signal, such as pulses of sine waves oscillating at an ultrasonic frequency, which is applied to an array of ultrasonic transducer elements that convert the electric pulse signal generated by each channel, such as channels 1 to 8, into ultrasonic waves traveling through the pipe wall. The timing of the pulse signals P1-P8 emitted by each transducer element E1-E8 is controlled by programmable delay units that are controlled by a microprocessor control system (not shown) of the PAUT. The wavefronts W1-W8 of the ultrasonic waves are generated from each transducer element E1-E8. The wavefronts W1-W8 are spherical, but they may be combined or superposed to form plane waves, creating a beam of sound traveling in a specific direction. Each wavefront W1-W8 has a wavefront direction D1-D8. Since the pulse P1-P8 from each transducer element E1-E8 is progressively delayed, each transducer may sequentially emit its pulse. This results in a beam of sound waves emitted at a wavefront steering angle θ to the array. The wavefront steering angle θ is formed between the wavefront direct D1-D8 and an axis vertical to each transducer element E1-E8. By changing the pulse delays, the microprocessor control system can scan the beam of ultrasound in a raster pattern across the pipewall. Echoes reflected by different layers of the pipewall, received by the PAUT, build up an image of the underlying structures and condition of the pipewall.

Figure 2:
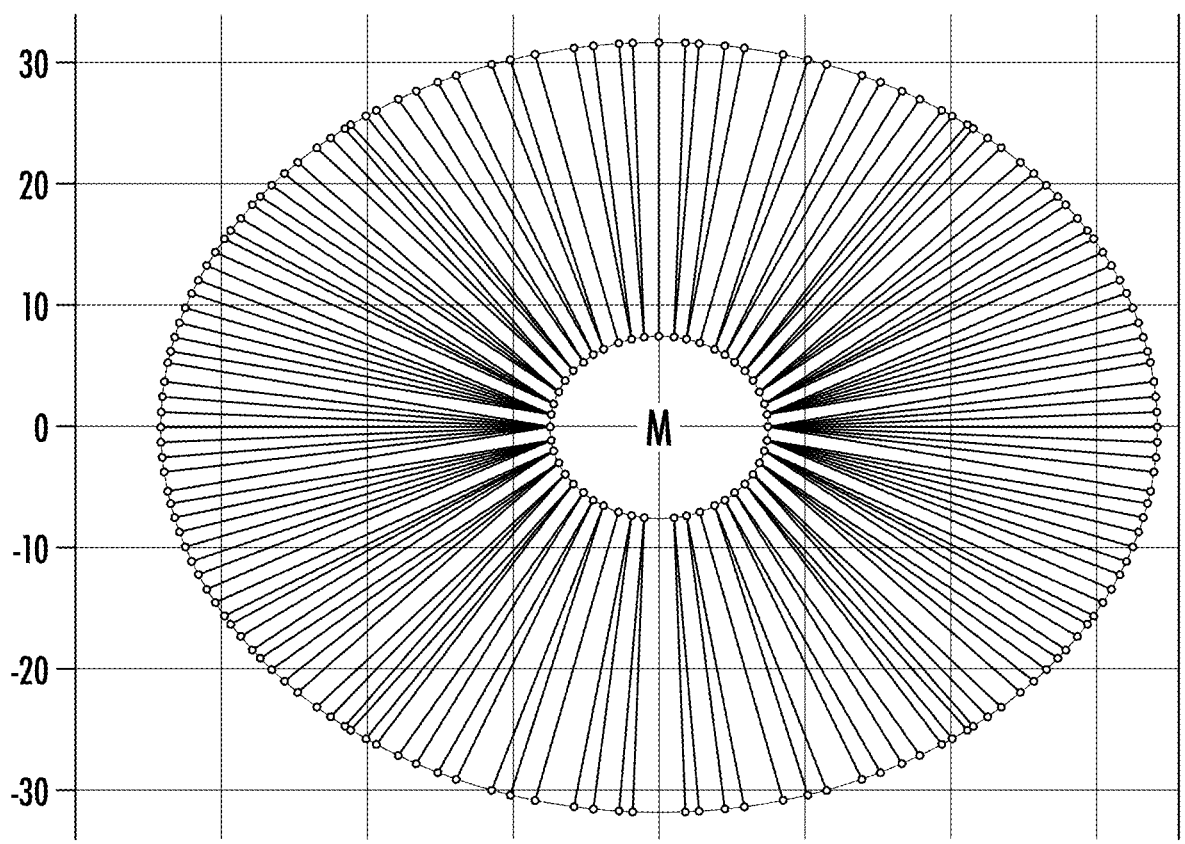
FIG. 2 is a diagram showing OOR coverage with optimal beam path from PAUTs, according to an embodiment.
Figure 3:
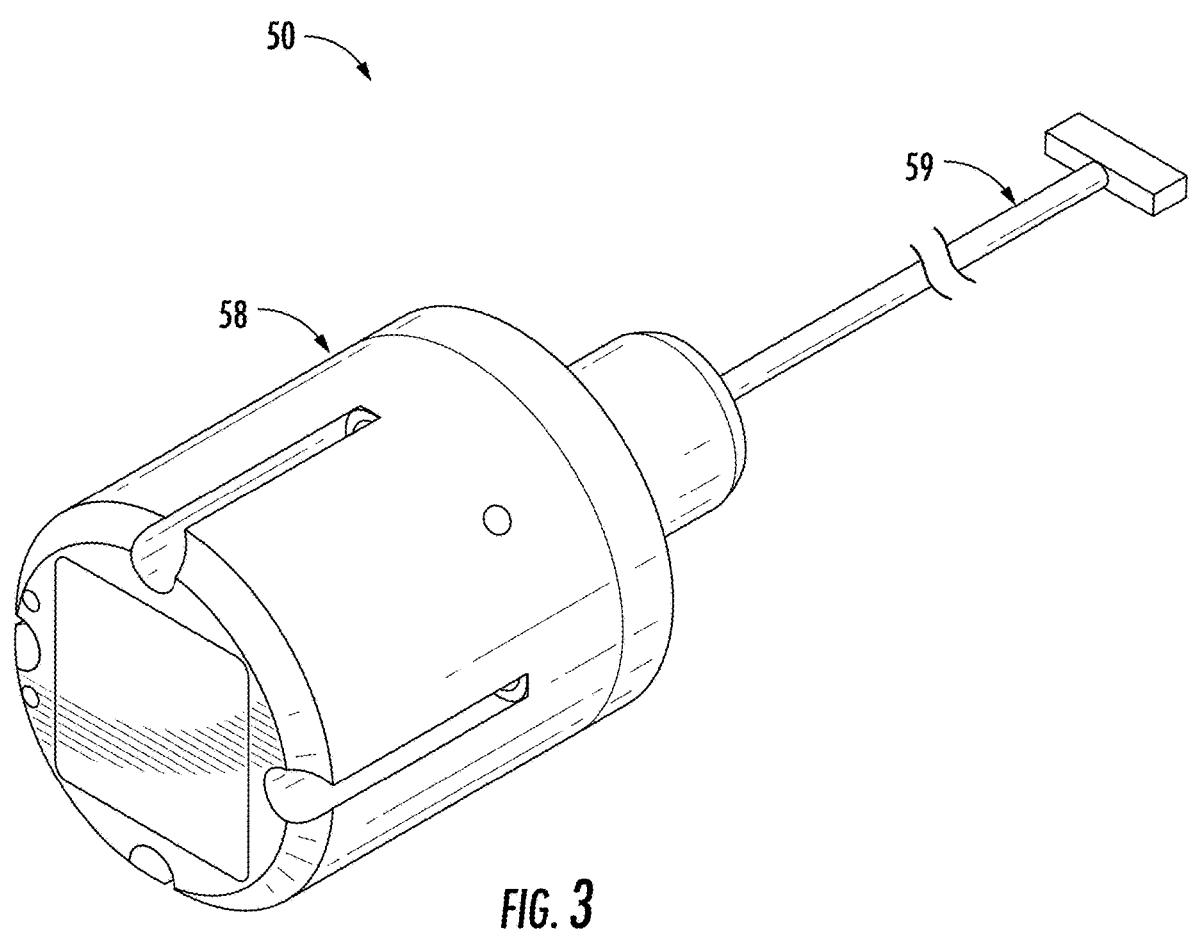
FIG. 3 is a diagram showing an example of an assembled and potted PAUT, according to an embodiment.
Figure 4:
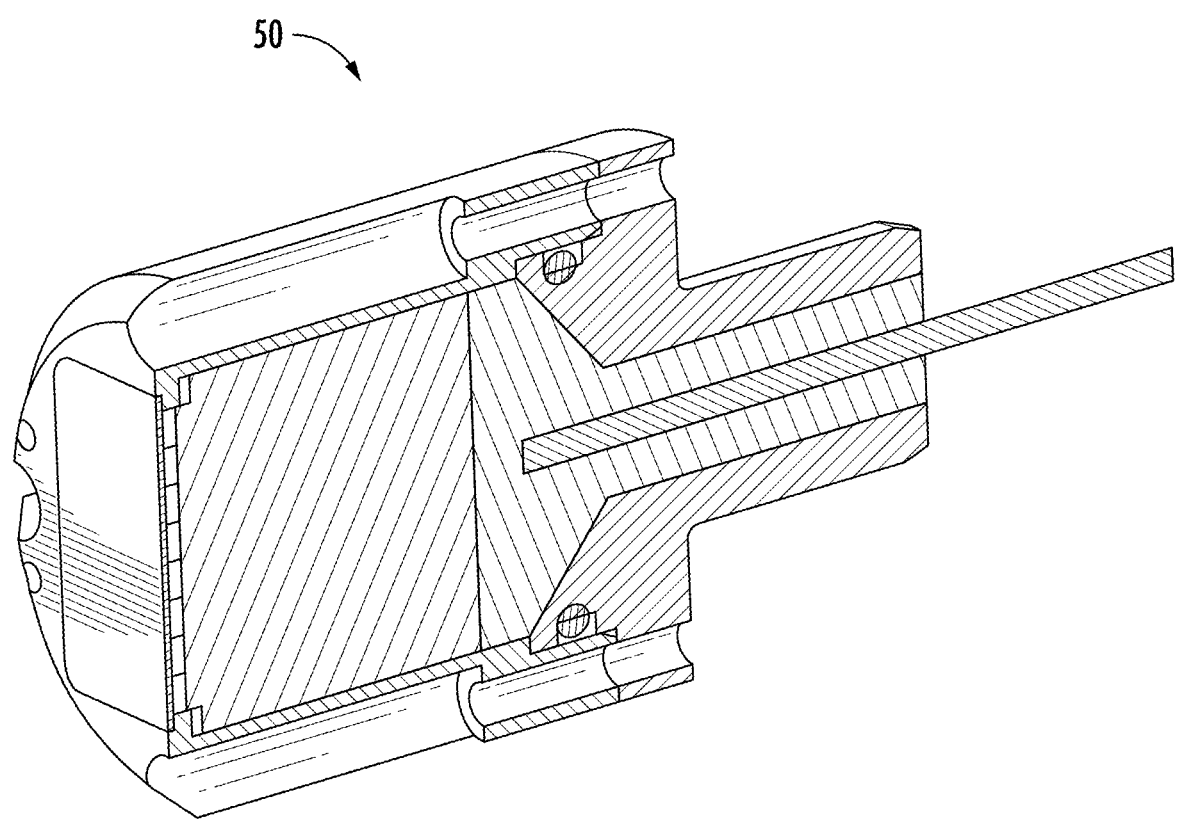
FIG. 4 is a cross sectional view of the assembled and potted PAUT in FIG. 3.
Figure 5:
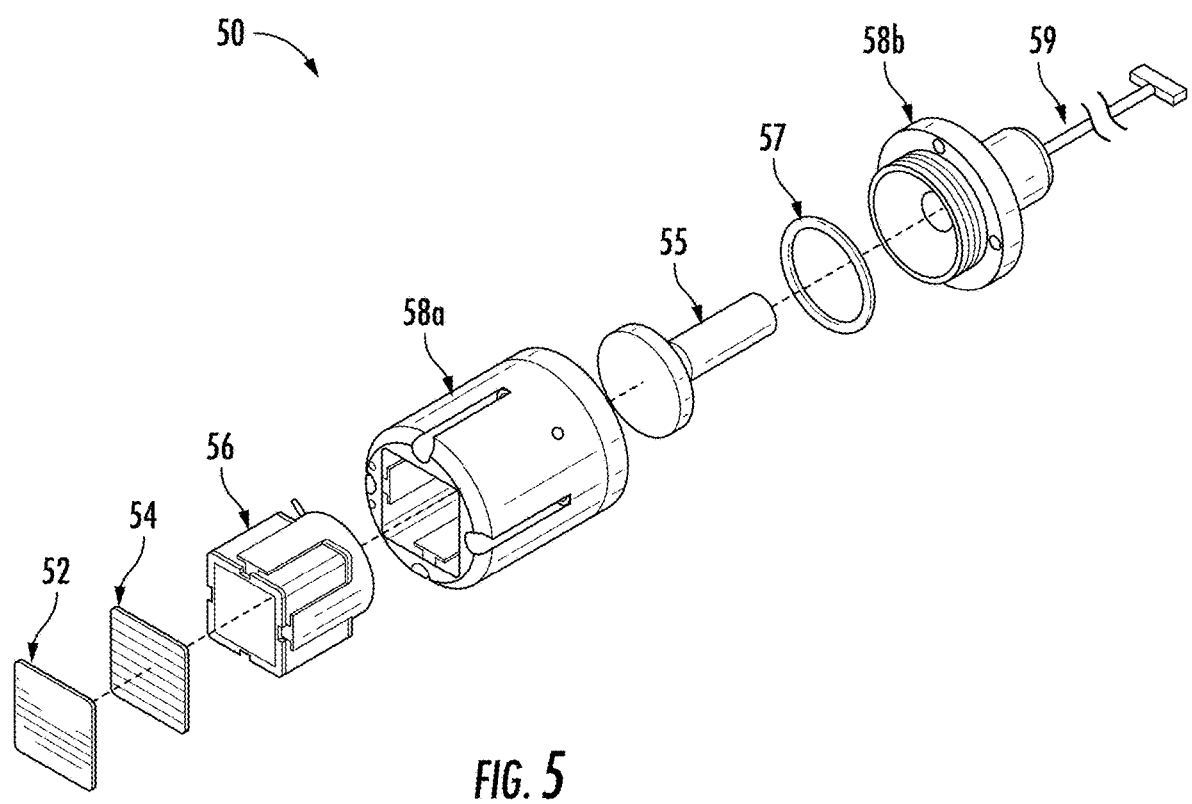
FIG. 5 is an exploded view of the PAUT in FIG. 3.

FIG. 2 is an illustration of a cross section of an OOR pipe showing the signal path of multiple PAUTs emanating from a central sensing module M of a conditional assessment device. By steering the acoustic beam of the PAUT, a user can capture more data in OOR pipes and increase the overall data coverage whereas the use of single element transducers may result in data lost in sections around the circumference where the reflection is lost due to the angle of incident depending on the severity of the OOR. device FIGS. 3-5 illustrate an embodiment a PAUT 50. FIG. 4 is a cross sectional view of the PAUT, and FIG. 5 is an exploded view of the PAUT 50 with possible internal components.

As illustrated in the example of FIG. 5, a PAUT 50 may include a matching layer 52, a sensor 54, a backing layer 56, and a housing 58. The matching layer 52 may be made from epoxy, and is configured to maximize the transmission of the ultrasonic energy from the piezo ceramic sensor 54 to the medium. The sensor 54 is configured to generate multi-channel ultrasonic waves. For example, the sensor 54 may be a 16×16 mm 16 Channels dice and fill PZT for generating 16-channel ultrasonic waves, or a piezo ceramic sensor. The sensor 54 generates the frequency oscillation and ultrasonic signals. The sensor 54 is placed between the matching layer 52 and the backing layer 56. The backing layer 56 may be filled with a tungsten powder epoxy composite and is configured to absorb ultrasound energy of the signals directed backward and attenuates stray ultrasonic signals from the housing 58. The housing 58 is configured to receive the piezo ceramic sensor 54 and the backing layer 56, to protect the PAUT 50 from water, and to provide electrical insulation and a mechanical structure for the PAUT 50 to withstand the pressure and mount onto the PAUT 50. The matching layer 52 is configured to cover the front end of the housing 58 in a water tight manner.

In the example of FIG. 5, the housing 58 may include the outer shell 58a and a back shell 58b. The outer and back shell configuration allows to reduce potential internal trapped gas bubbles during the assembly process. This configuration is important for the bonding and watertightness of the PAUT 50 as the PAUT 50 will be subjected to a high-pressure underwater environment. In the example of the FIG. 5, the outer shell 58 as a substantially cylindrical shape. The outer shell 58 may also have other shapes.

As well, the PAUT 50 may include an O-ring seal 57 may be placed between the outer shell 58a and back shell 58b. The O-ring seal 57 may be made from nitrile or Viton. The PAUT 50 may also include a potting 55 placed at a rear end of the sensor 54 to reduce the potential trapped gasses. The potting 55 may be made from epoxy.

The matching layer 52, the outer shell 58a and a back shell 58b, the O-ring seal 57, the potting 55, and the backing layer 56 collectively provide a watertight configuration of the PAUT 50.

As well, the PAUT 50 may comprise a cable and connector 59 having a first end for connecting to the sensor 54 via the back shell 58b, the potting 55, and the backing layer 56, and a second end, which may be a connector, for connecting to a circuit of a sensing module.

The sensor 54 is placed between the matching layer 52 and the backing layer 56 to focus the energy of the pulse outwards towards the pipe wall. In some examples, the PAUT 50 may use light materials to reduce weight. For example, both the outer shell 58a and back shell 58b are made from plastic, such as PEEK (polyetheretherketone), for mechanical strength to withstand the pressure loading.

In addition, PEEK has good bonding performance with epoxy to aid in watertightness and has a similar rate of thermal expansion as epoxy. Using PEEK allows the overall PAUT 50 to expand and contract with the temperature range that the PAUT 50 is subjected to under extreme cold and hot environments during storage. This decreases the risk of delamination between the shell and potting material therefore deceasing the risk of water intrusion into the main sensing module through the PAUT 50. Using a metallic shell instead of plastic or PEEK would have a high risk of delamination and thus water intrusion. Using plastic or PEEK for the shell material can also reduce the overall density of PAUT 50 as the density of plastic or PEEK is low. Therefore, having multiple PAUTs 50 made from plastic or PEEK mounted on a sensing module reduces the overall weight of the sensing module, as the assembled sensing module needs to be buoyant in order to achieve an overall neutrally buoyant fully assembled condition assessment device to improve centering performance.

As such, unlike existing PAUTs, which are not for full immersion pressurized environments and normally use dry connectors, the PAUT 50 may be used in full immersion pressurized environments and may stand pressure of up to 500 psi or more.

Figure 6A:
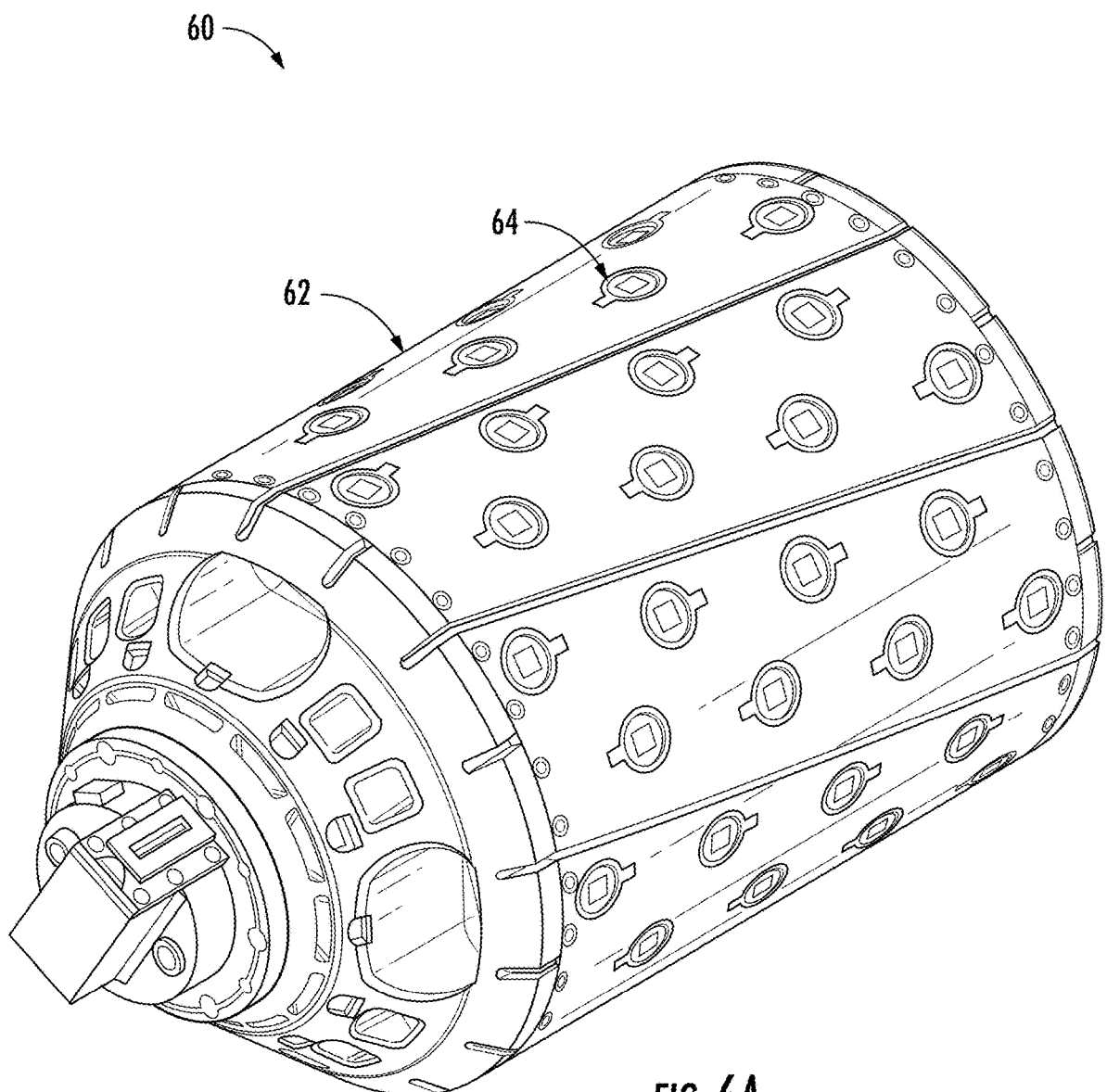
FIG. 6A is a perspective view of a guard for receiving one or more PAUT of FIG. 3.
Figure 6B:
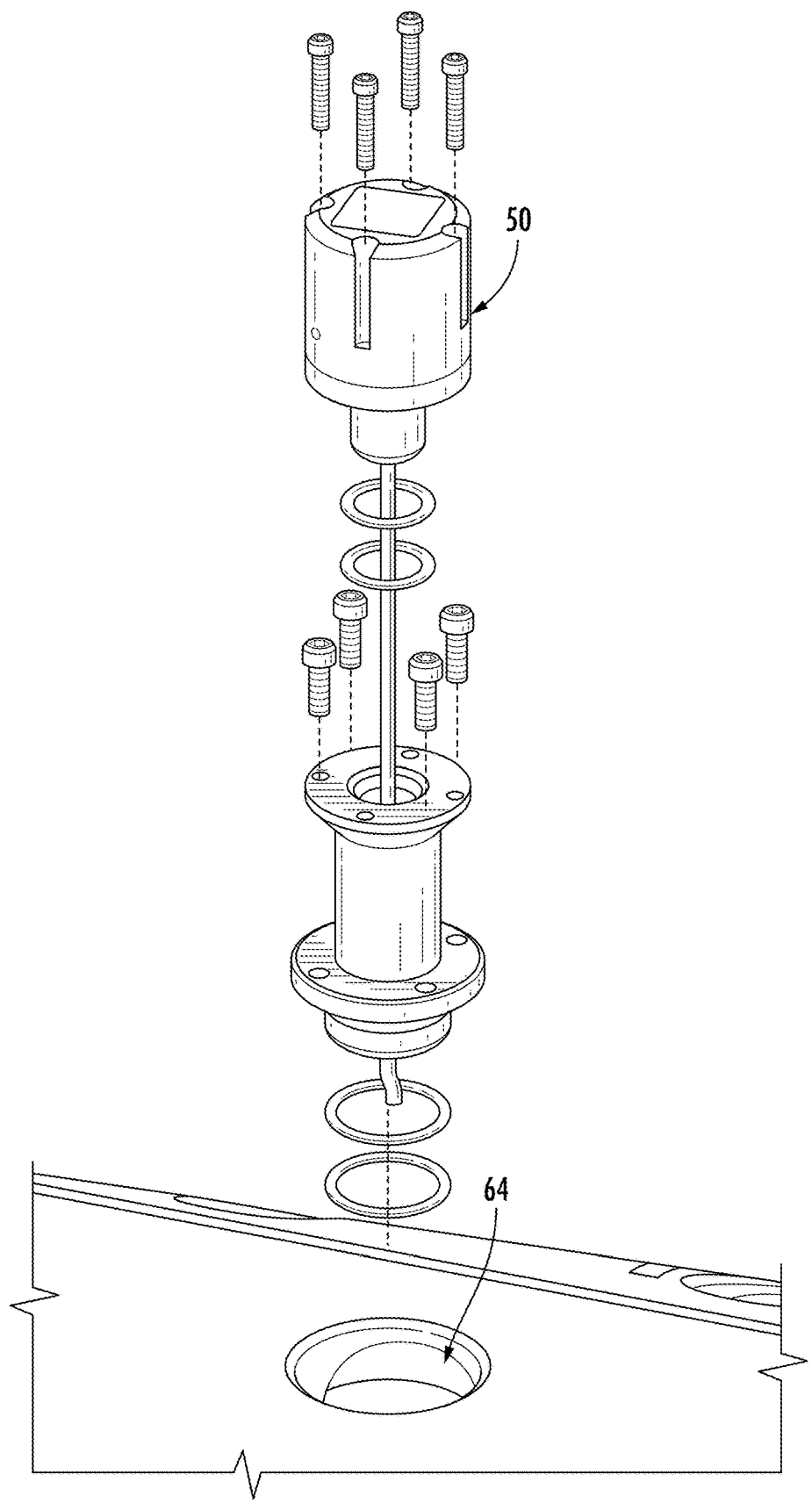
FIG. 6B is a exploded perspective view for mounting a PAUT in FIG. 3 to a socket of the guard in FIG. 6A.
Figure 6C:
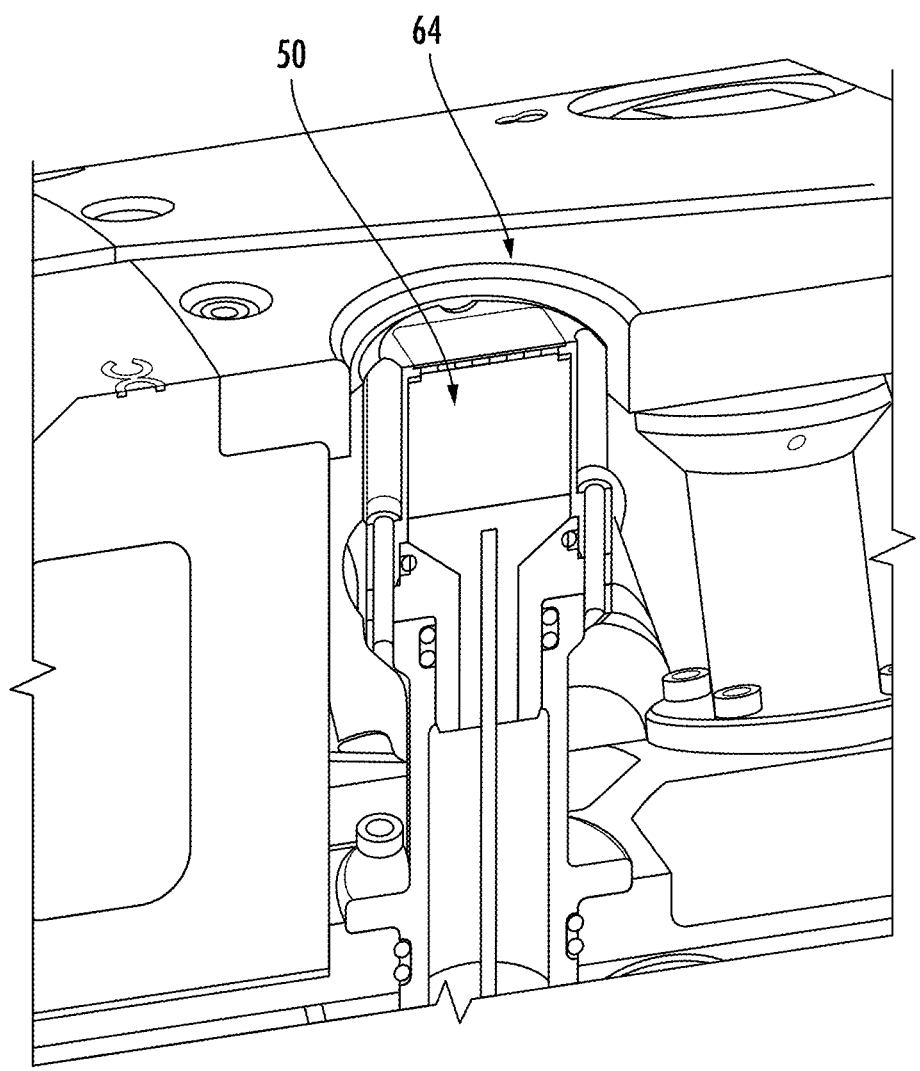
FIG. 6C is a partial cross-sectional view of the socket in FIG. 6A after the PAUT is mounted therein.

One or more PAUTs 50 may be assembled as a sensing module. As illustrated in FIGS. 6A-6C, the sensing module 60 may include a guard 62 and one or more PAUTs 50. The guard 62, which may be a High-density polyethylene (HDPE), or Acetal guard, may be used to protect the PAUTs 50 from impacts against the pipeline wall of pipeline features. The guard 62 has a plurality waterproof sockets 64 distributed on the surface of the guard 62, and each socket 64 is configured to receive a PAUT 50. A PAUT 50 may be mounted into a watertight socket 64 with the cable and connector 59 pass-through and securely mounted, such as fastened with screws, onto the sensing module 60. The guard 62 has a substantial cylindrical shape in the example of FIGS. 6A-6C, and the guard 62 may also have other shapes.

Figure 7A:
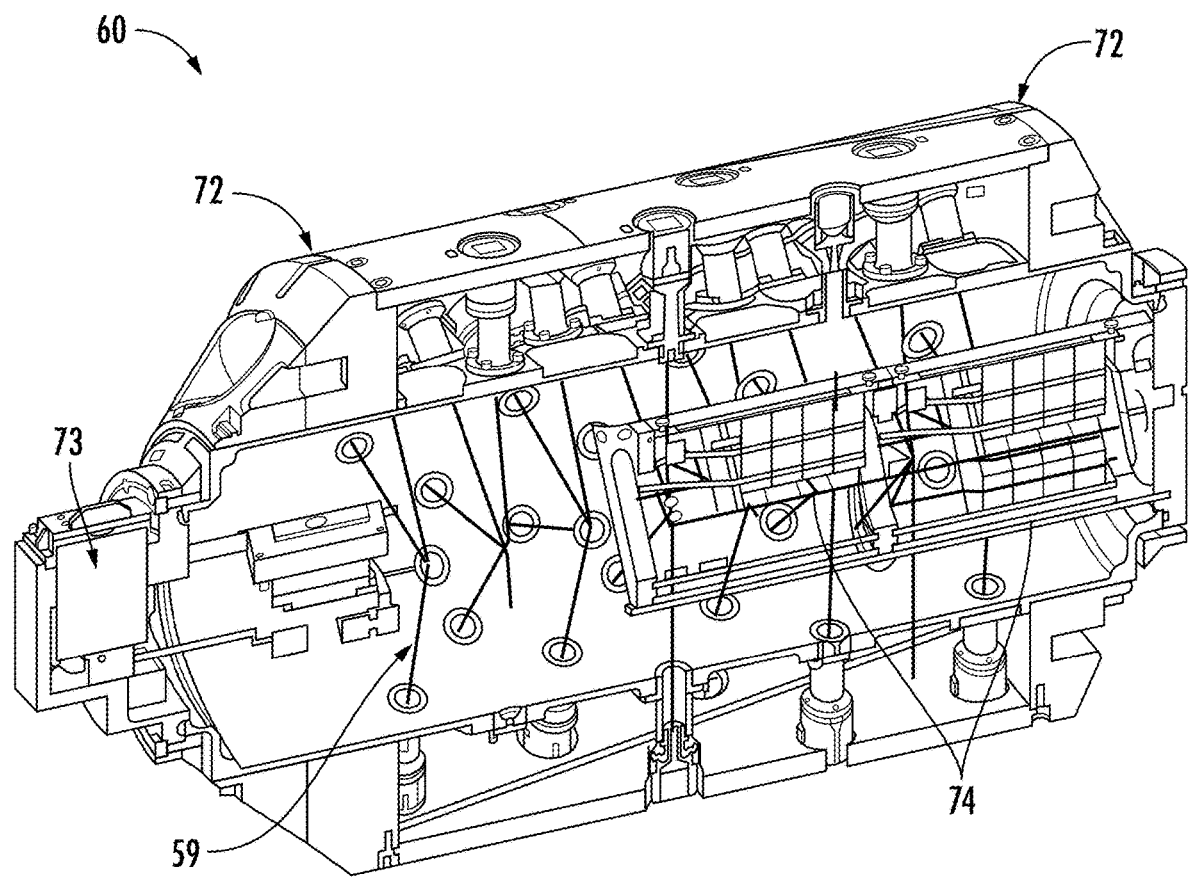
FIG. 7A is a cross-sectional view of a sensing module.
Figure 7B:
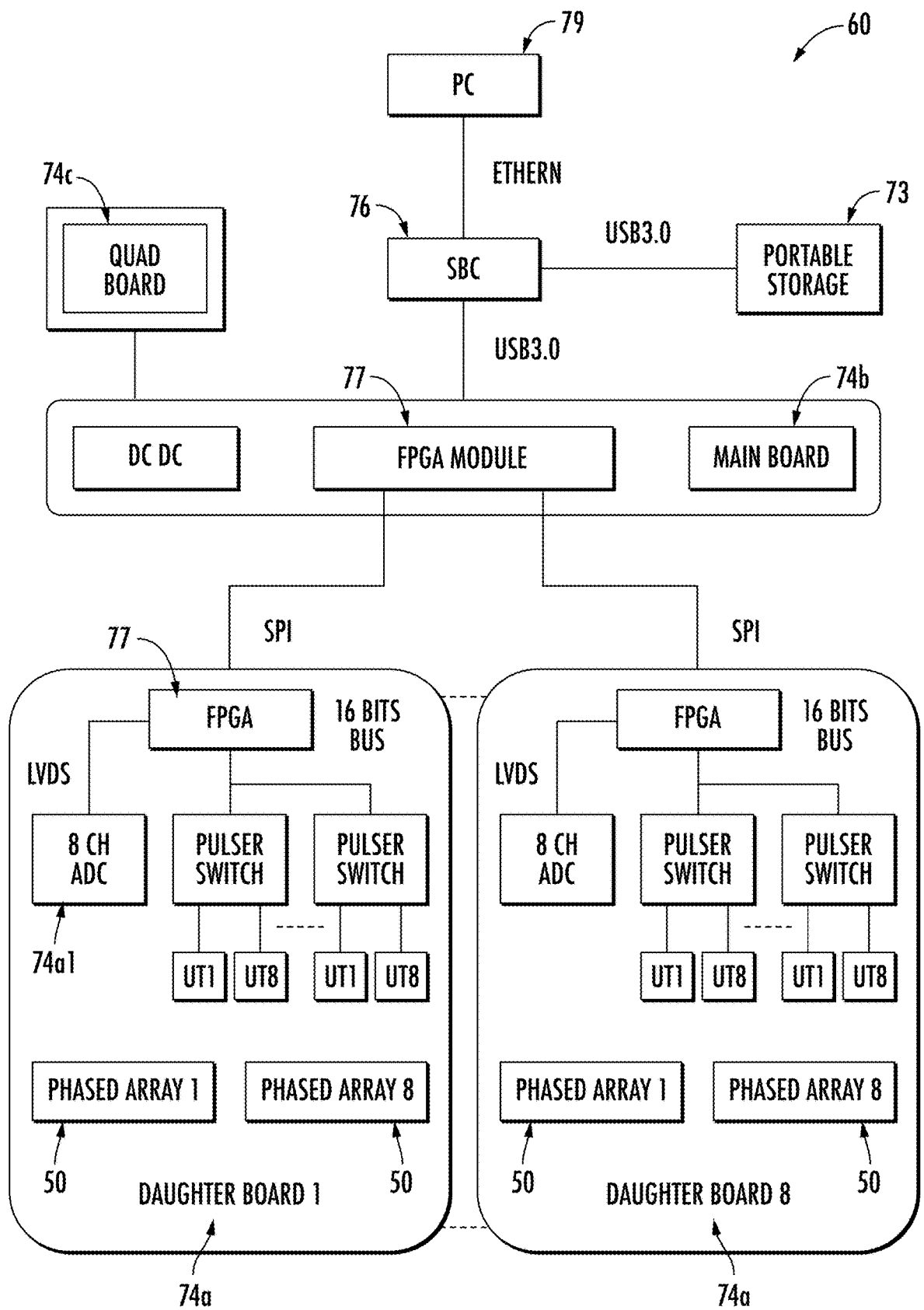
FIG. 7B is a block diagram of the sensing module in FIG. 7A.

The sensing module 60 may also house the electronic PAUT driver boards and data storage drive that may record data from each PAUT 50 during the firing sequence. The data storage drive is accessible through a side pressure rated, sealed hatch for quick data extraction. As illustrated in FIGS. 7A-7B, the sensing module 60 may include a plurality of electronic circuit boards 74, which may be printed circuit boards (PCBs). Each electronic circuit boards 74 may include a plurality of daughter boards 74a and one or more main boards 74b. Each cable and connector 59 of a PAUT 50 may be connected to a daughter board 74a. For example, 8 PAUTs 50 may be connected to a daughter board 74a. The daughter board 74a is configured to fire and steer multi-channel ultrasonic signal beams, and to receive the reflected signals. For example, the daughter board 74a may include a beamforming oscillator (TX) or a signal source that produces an electronic signal at an ultrasonic frequency, which is applied to sensor 54 to generate multi-channel ultrasonic waves, for example from channels UT1-UT8, for firing toward the pipe wall. The daughter board 74*a* is configured to control pulser switch working mode, the timing of firing the pulse signals or the phase of the signals by programmable delay, such as by a controller 77. For example, the controller 77 may first switch the pulser switch to a transmitting mode, so that the pulser switch may generate phased pulses to channels UT1-UT8. After programmed delay, the controller 77 may switch the pulser switch to to a receiving mode, so that the ADC 74*a*1 can receive the echo signals.

Multiple daughter boards 74*a* may be used to connect all the PAUTs 50 in the sensing module 60. A Quad board 74*c* may collect voltage, current, humidity, pressure and Internal measurement unit (IMU) data of the device sensing module 60. The main board 74*b* may collect the data from the daughter board 74*a* and data from the Quad board 74*c* and transmit the collected data out to a SBC 76 (single board computer), for example via a USB interface. Each of the main board 74*b* and the daughter board 74*a* may include a controller 77, such as an FPGA, for controlling the overall testing process, measurement data processing, and internal and external communications. A daughter board 74*a* may also include an analog to digital converter 74*a*1 for converting the measured analog signals received by the PAUT 50 to digital signals. The SBC 76 collects data from the main board 74*b* and saves the data to a memory 73, such as a solid state drive (SSD) or a portable storage device, via a communication interface. When the sensing module 60 is used in an assessment device, when the device is removed from the pipeline after testing, the data can be exported to an external computer 79 for further processing, such as via an Ethernet connection. In this regard, the sensing module 60 may include a removable data storage 73, which stores the data collected and may be removable from the sensing module 60 for processing in the external computer 79.

As illustrated in FIG. 7A, the sensing module 60 may also include a plurality of air bleed holes 72 in the guard 62 to allow an accurate pre-inspection balancing of the device to increase centering performance of the device in the pipe. For example, an accurate pre-inspection balancing of the device may be achieved by adding balancing weights to the air bleeding holes 72 along the length of the device, to ensure that the device is leveled in open water and slightly buoyant overall.

Figure 8:
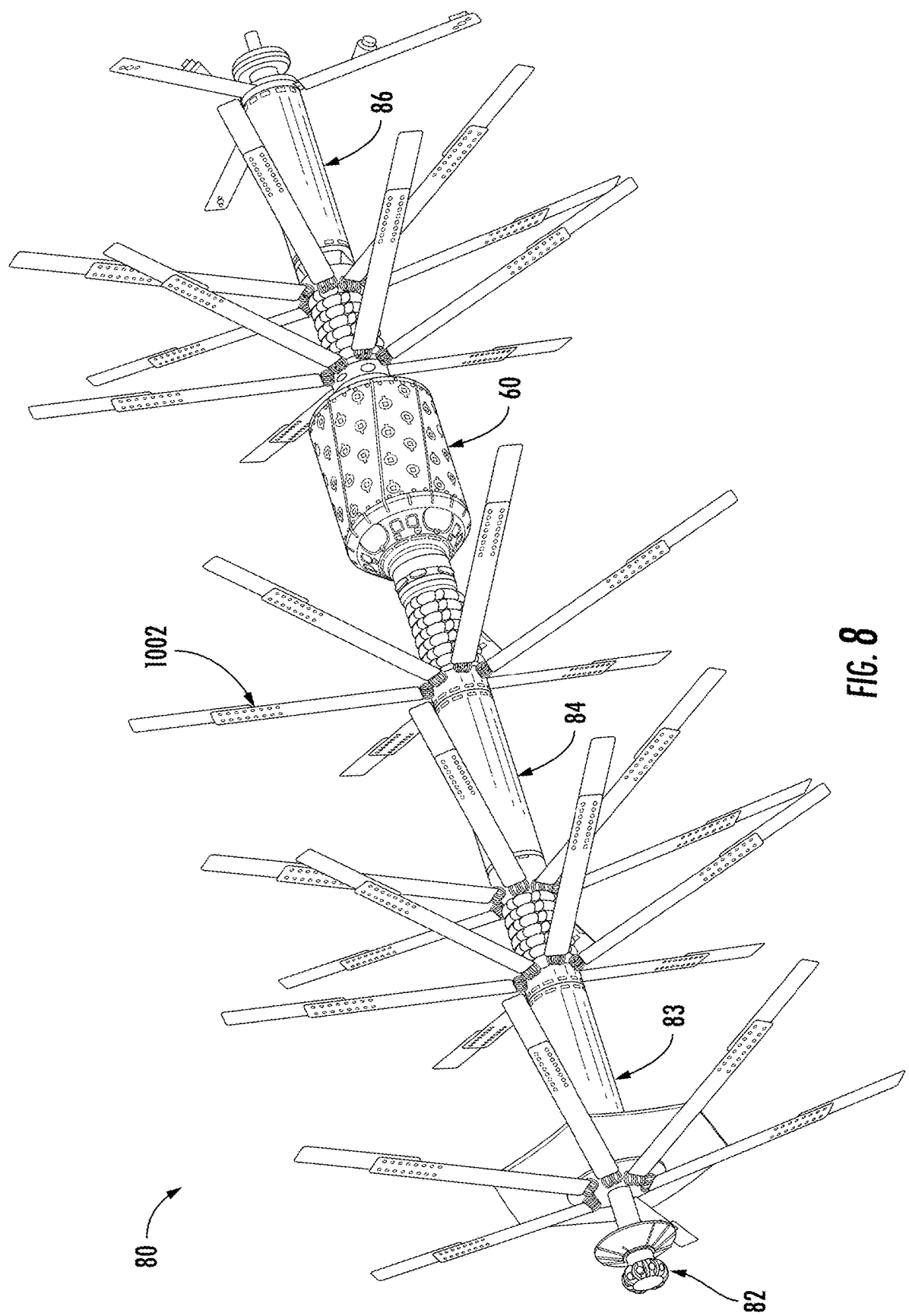
FIG. 8 is a perspective view of an exemplary device with for pipeline condition assessment with the sensing module of FIG. 7A, according to an embodiment.

FIG. 8 illustrates an example of an inspection device 80. In the example of FIG. 8, the device 80 includes a nose portion 82, two front battery modules 83 and 84, the sensing module 60, a rear battery module 86. The nose portion 82 flexes and steers the device 80 as the device 80 impacts pipe features. The device 80 may include a plurality of supporting petals 1002 to support the device 80 and to protect sensing module 60, the battery modules 83, 84 and 86. The modules 82, 83, 84, 60 and 86 may be connected with flexible linkages and the device 80 is supported with spring loaded support petals 1002 to keep the sensing module 60 in the center of the pipe for optimized data collection while traversing the pipeline. In this configuration, the device 80 may include additional sensing equipment such as video acquisition, after the rear battery module 86. The battery modules 83, 84, and 86 are used for powering the sensing module and additional sensing equipment. The device 80 may include more or fewer battery modules. For example, a 3-module configure is also a possible where one of the front battery modules 83 or 84 is removed.

Figure 9A:
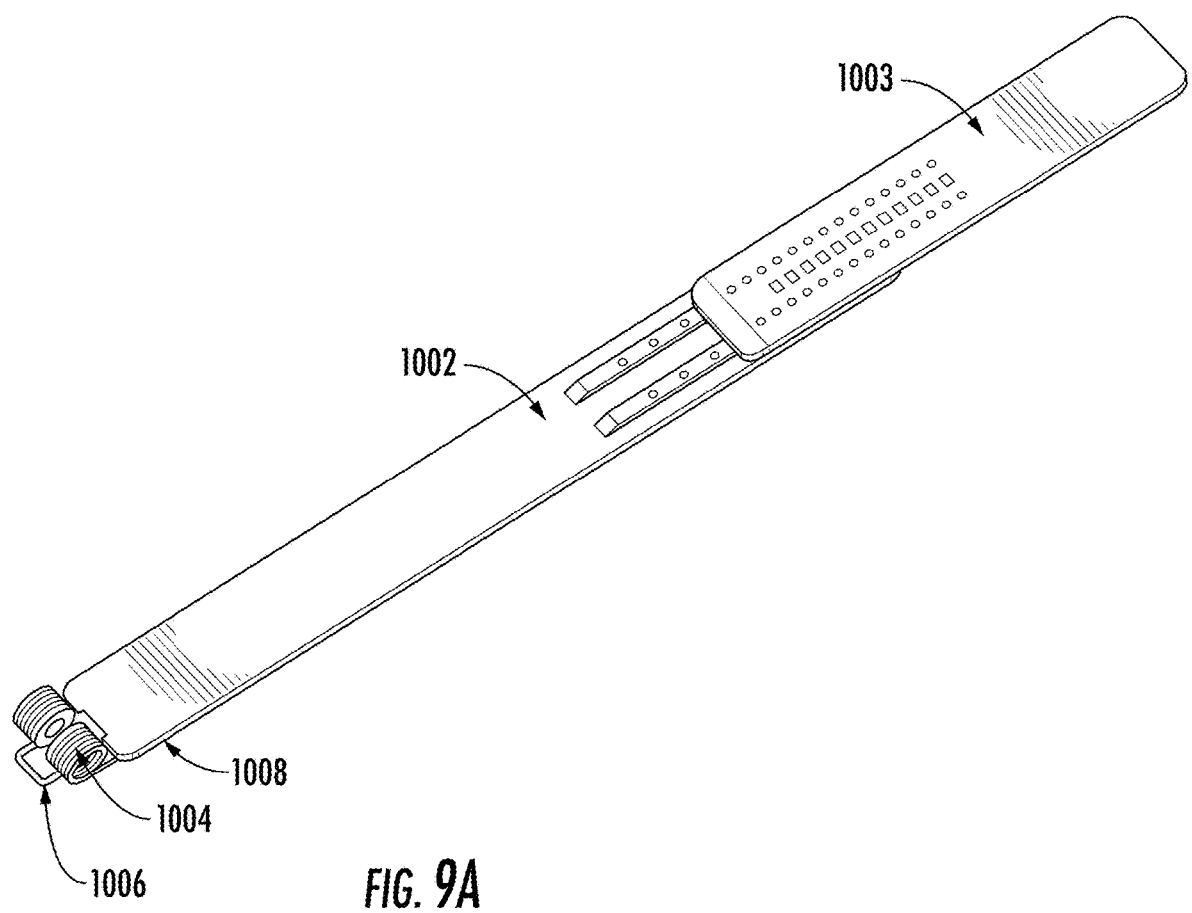
FIG. 9A is a perspective view of a pre-load torsion sprung supporting petal of the device in FIG. 8, according to an embodiment.

In order to improve the centering performance of the device 80, as illustrated in FIG. 9A, the supporting wear petals 1002 may include a pre-loaded spring force in the fully deployed position to reduce the device's sensitivity to buoyancy changes. Each petal 1002 may include a petal extension 1003 is mounted at the end of petal 1002 and the petal extension 1003 provides a contact point of the device 80 to the pipe wall. The petal extension 1003 is replaceable due to wear overtime. The petal extension 1003 also allows for precise overall length adjustments to the petal to adjust and size the petals for various pipe diameters by having a plurality of mounting positions to the petal 1002.

The petal 1002 is has a urethane structure with a pivot joint 1004 and torsion spring 1006 molded at the base 1011 mounted onto the device 80. The torsion spring 1006 provides a preload when the petal 1002 is at its fully expanded rest position deployed at 75 degrees relative to the axis of the device 80. The rest angle may be any angle. The stopper feature on the pivot joint 1004 prevents over rotation of petal 1002 once the petal 1002 is mounted to the device 80. The preload force of the torsion spring 1006 may overcome any shift in buoyancy of the device 80 during inspection to allow the device 80 to remain centered during the scan of the pipeline.

Changes in the buoyancy can occur from a shift in density in the urethane components due to water saturation, volume displacement of components may change due to effects of compression under pressure and trapped air pockets during the open water balancing may add to the inaccurate pre-insertion device preparation process.

Figure 9B:
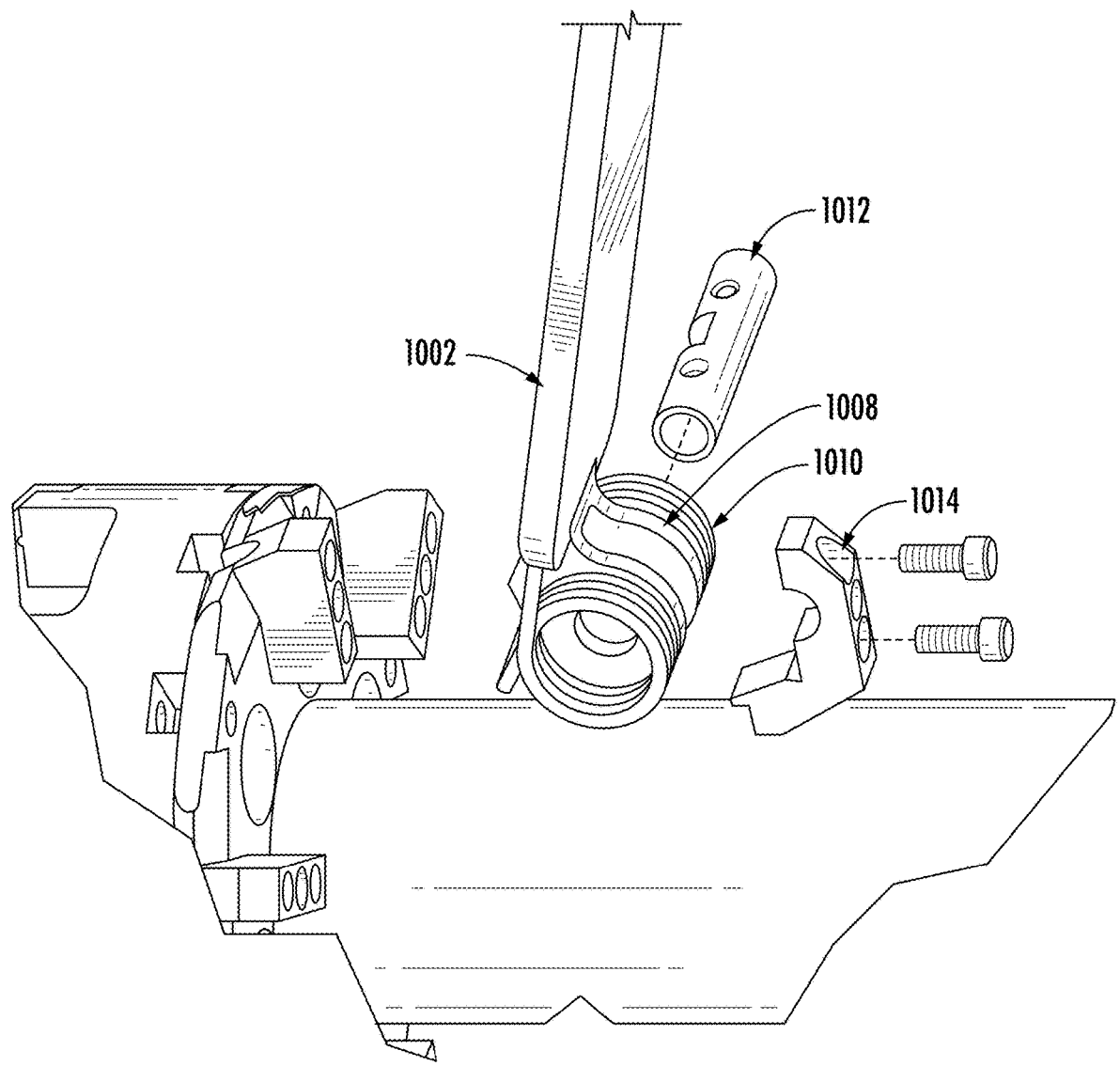
FIG. 9B is an enlarged exploded view of exemplary components for mounting the petal of FIG. 10A to the device of FIG. 8.
Figure 9C:
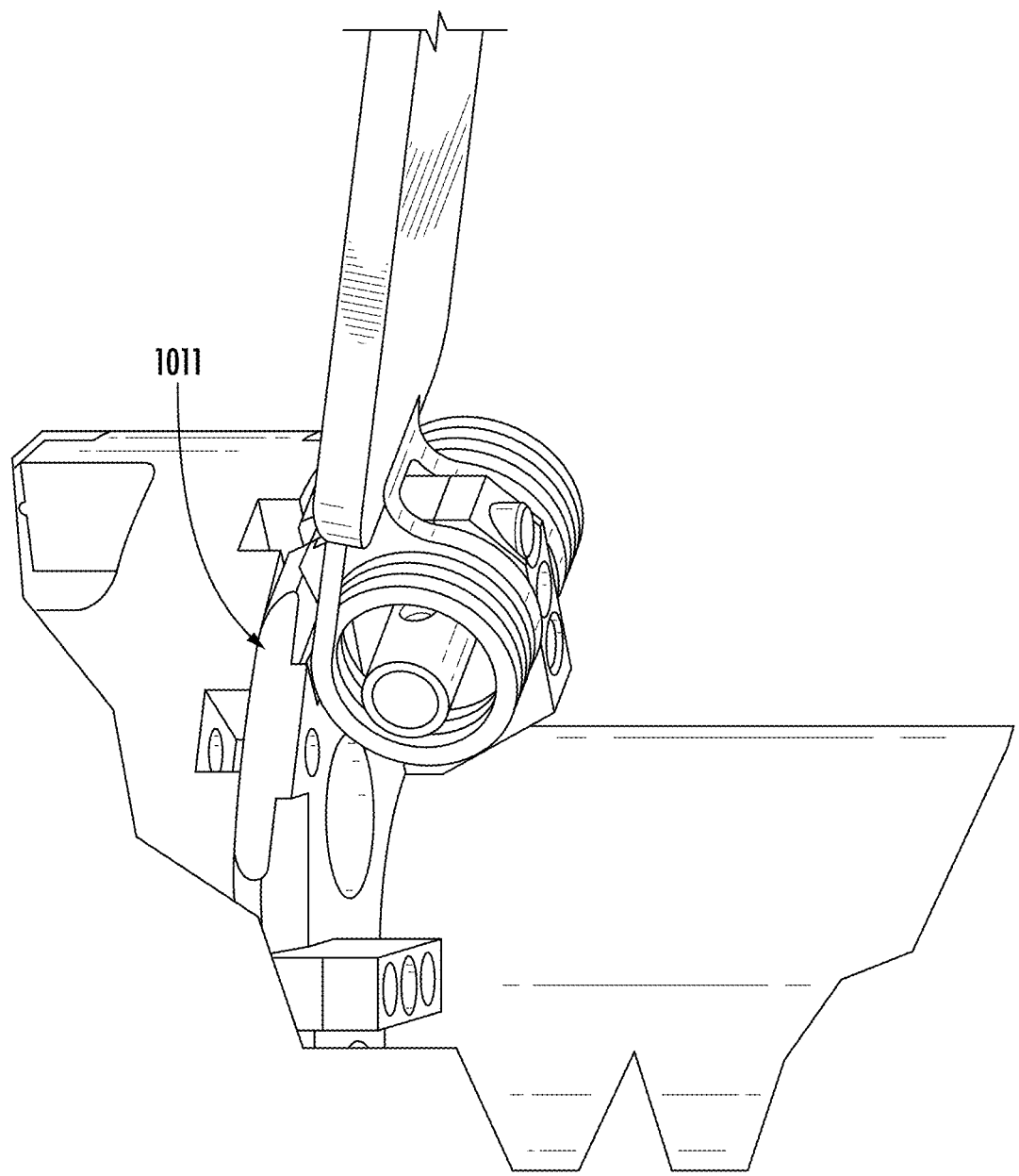
FIG. 9C is an enlarged perspective view of the petal in FIG. 10B mounted to the assembly of FIG. 8 according to an embodiment.

In FIGS. 9A-9C, a spring 1010 may be securely mounted at an end of the insert element 1008. The insert element 1008 may be securely inserted in an end of the petal 1002. FIG. 9A illustrates that a biasing middle portion 1006 of the spring 1010. After the spring 1010 is mounted to the petal 1002, the biasing middle portion 1006 is configured to keep the petal in an extended state away from the middle axis of the device 80. An inner element 1012 may be inserted within the insert element 1008 and spring 1010 as illustrated in FIG. 9C for enhancing the structural strength of the spring 1010. An elastic external element 1014 may be mounted to the insert element 1008 and the bottom portion of a module of the device 80.

Figure 10:
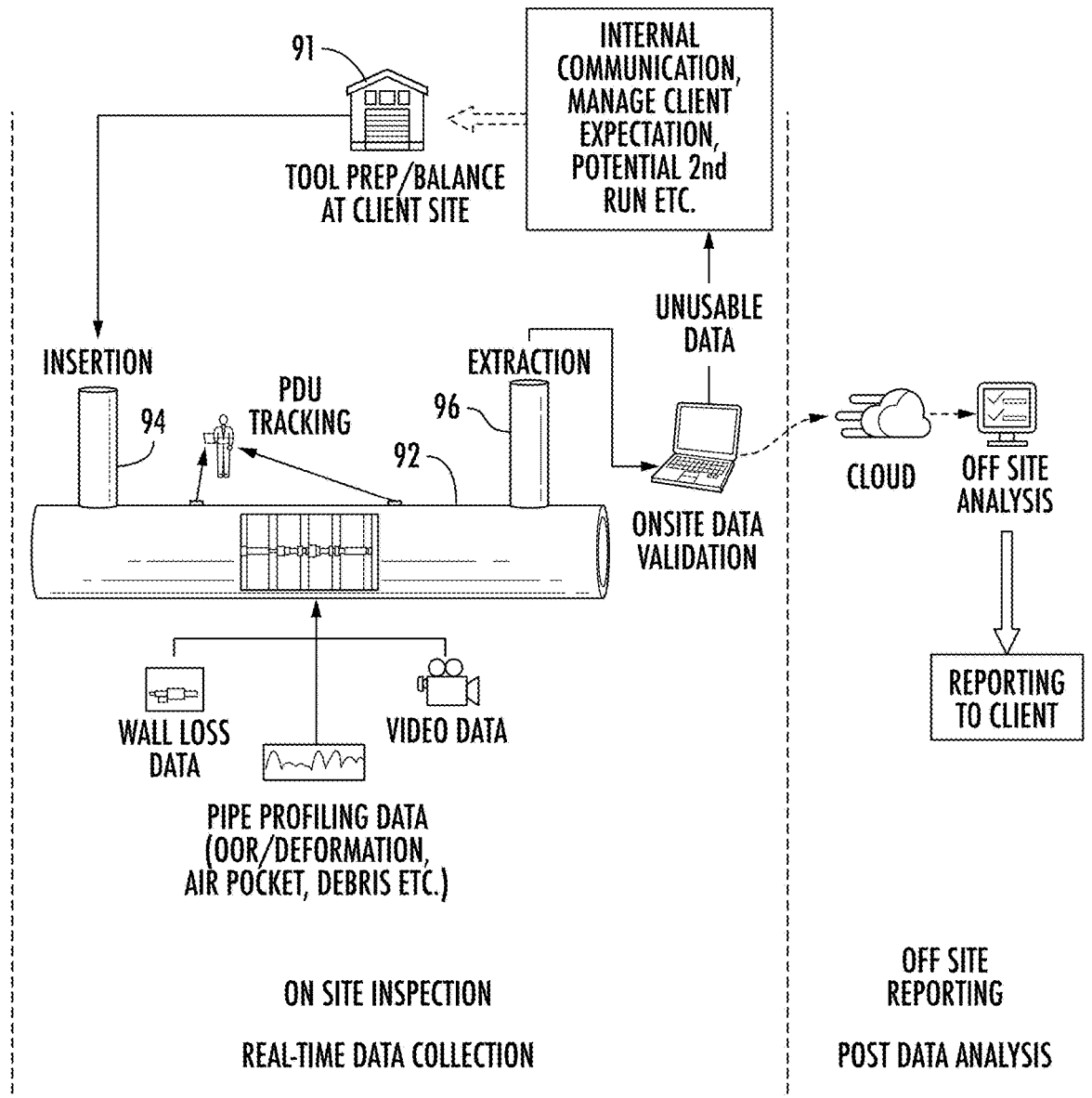
FIG. 10 is a schematic view of an example of pipeline condition assessment using the device of FIG. 8, according to an embodiment.

As illustrated in the example of FIG. 10, the inspection process may begin with the device 80 being turned on and the data recording initiated at site 91. The device 80 may be then inserted into a pipeline 92 through an existing feature 94 such as a manway, in a depressurized state. The manway may then be closed and the pipeline may be re-pressurized with the pumps turned on to generate the flow. Alternatively, an insertion pipe to launch the device 80 under pressure and flow can also be deployed to minimize disruption. The device 80 is then carried by the flow of the medium in the pipeline 92 and the device 80 passively traverses inline features until device 80 reaches the end point or extraction point 96. The data sensed and collected by the sensing module 60 may include wall lose data, pipe profiling data including OOR/deformation, air pocket, debris data, etc., and video data. Once the device is extracted from the pipeline 92, the recording of sensed data in the sensing module 60 may be stopped, and the stored data may then be removed from the sensing module 60 and sent for analysis. The date may be onsite validated. Valid data may be uploaded, such as to the cloud, for storage for off-site analysis and reporting. Invalid data may be discarded and a new test may be conducted.

Figure 11:
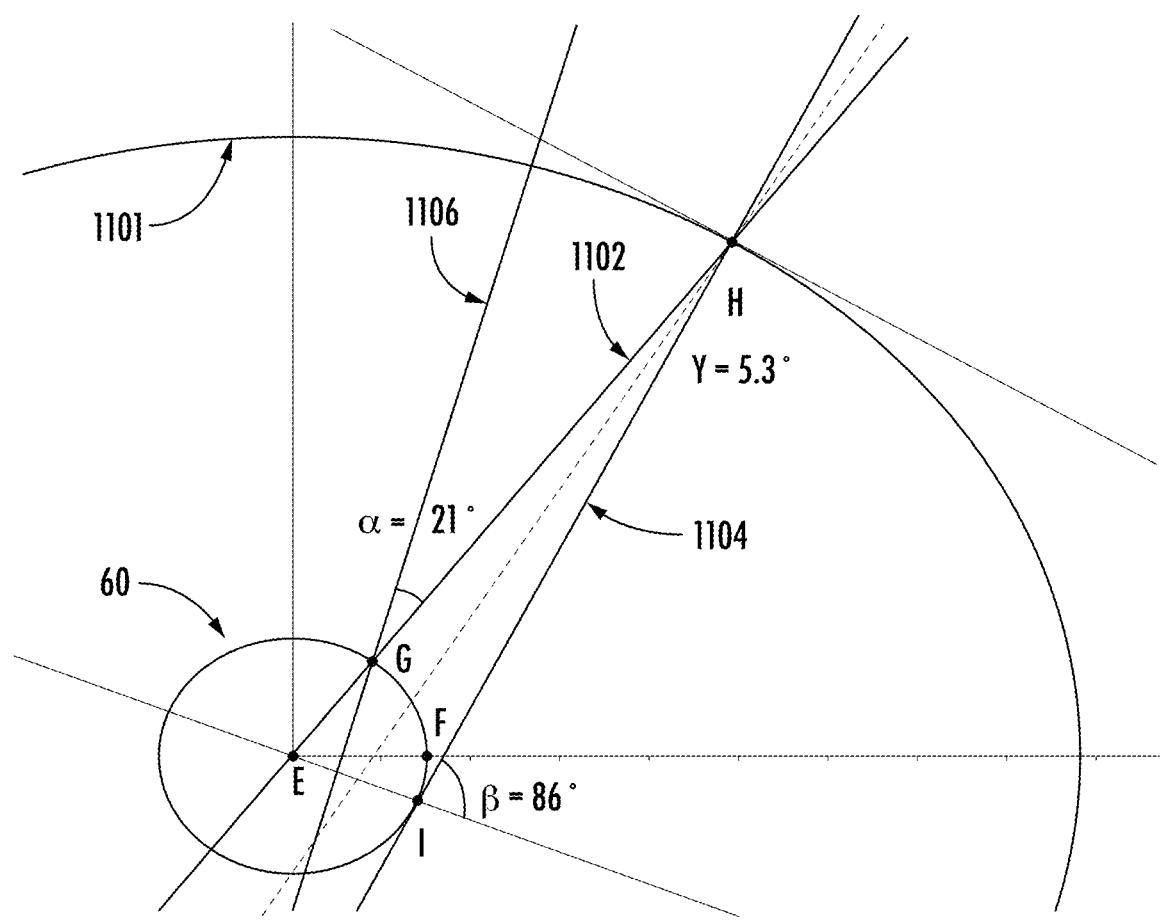
FIG. 11 is a diagram illustrating the cross section of a pipe with the beam path projection onto an OOR pipe wall, according to an embodiment.

FIG. 11 illustrates a cross section of a pipe with the beam path from a PAUT 50 of the sensing module 60 to the pipe wall and the reflection off the wall. In this example, the sensing module 60 and a pipe wall 1101, such as with an 82" diameter, 5% OOR pipe wall, are illustrated. The (0,0) point E represents the center of the sensing module 60. The line 1102 represents the beam path of an acoustic firing signal in-line with the transducer axis typical for a single element transducer. The line 1104 represents the reflected peak signal of the acoustic firing signal off the pipe wall at point H which is shown to miss the 15" sensing module 60. This is represented as lost data. In the PAUT 50 acoustic firing, multiple firing signals are emitted at various angles and recorded. Among the firing signals, an acoustic recording of the reflected signal has the highest strength. In this example, the line 1106 represents the optimal beam path at 21 degrees off the transducer axis which provides a normal angle of incidence with the pipe wall. The reflected signal along the line 1106 has the highest strength. This allows the peak reflected signal to return to the firing PAUT for recording.

Typically, the acoustic signal with beam perpendicular to the pipe wall and its tangent have the highest strength. Angle alpha is the steered angle of PAUT 50 at point G. Angle beta is the receiving angle for PAUT 50 at point I. In the example of FIG. 11, beta is reading 86 degree showing the line 1104 is almost normal to beam at point I of the PAUT 50 the signal is mostly lost. Angle gamma is the angle between beam at point G and the pipe normal at point H. In the example of FIG. 11, this angle is 5.3 degree caused the reflection almost missed sensing body.

Figure 12:
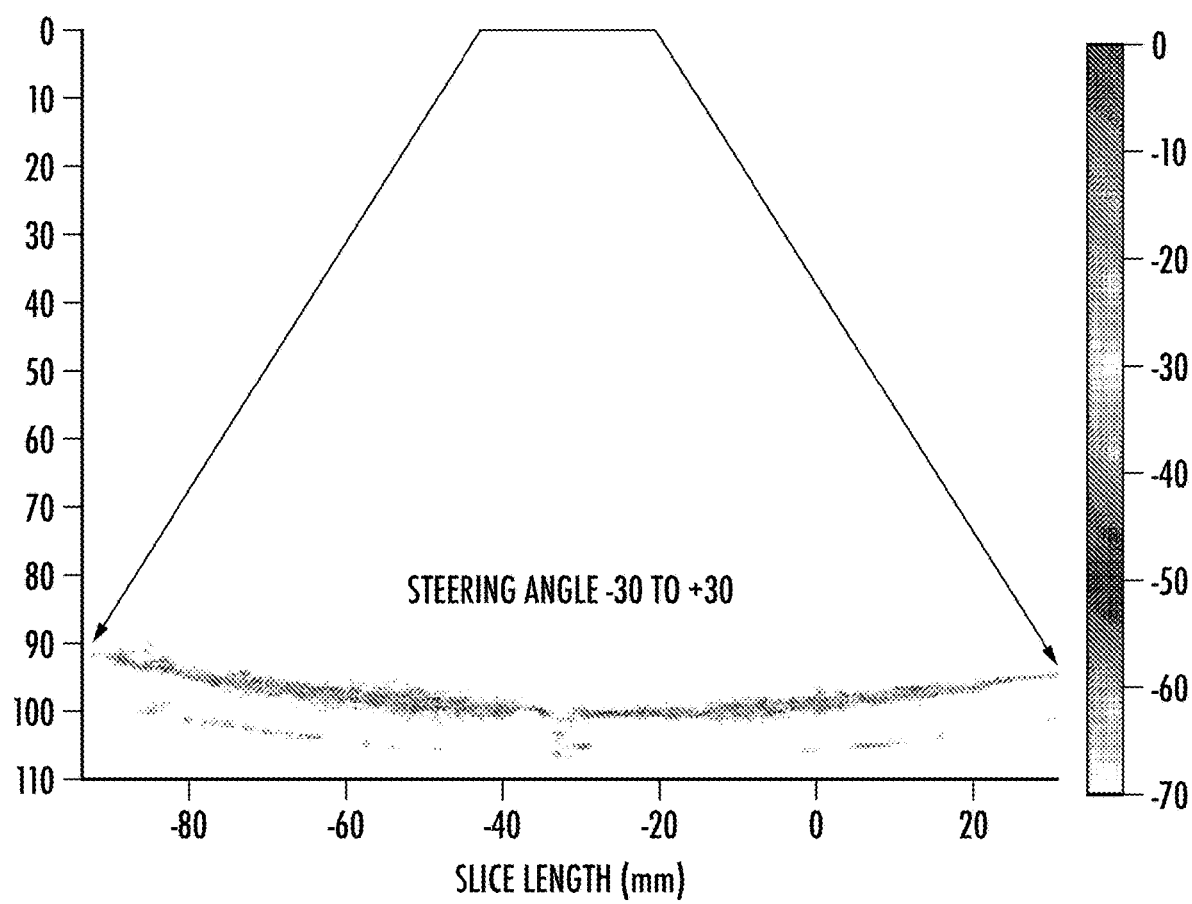
FIG. 12 is a diagram illustrating reflection signal from a beam sweep from one PAUT, according to an embodiment.

FIG. 12 is an example of the data collected from the pipe wall from one complete −30° to +30° signal sweep from one PAUT 50. The data from the recorded signal reflections are reconstructed for the data analysis of the pipe wall. The signal sweep provides multiple points of data along the sweep. Each data point can reveal the wall details at that specific point such as wall thinning or delamination. A defect of a pipe wall may be detected by wall details revealed by the data points.

Therefore, with multiple PAUTs 50 mounted around the sensing module 60, a user can achieve a higher percentage of data coverage around the circumference of an OOR pipe when compared to the use of single element transducers. With the multiple PAUTs 50 used in a sensing module 60, there may be potential signal overlap between adjacent PAUTs 50. Signal or data overlap can provide higher resolution and improve data accuracy due to data redundancy. Signal or data overlap allows each PAUT 50 to find the strongest signal from one signal sweep which provides accuracy in measurements and utilizes additional signals of adjacent PAUTs 50 in the sweep to further confirm or provide subtle correction to the measurement to improve precision. Signal or data overlap also allows adjacent PAUTs 50 to provide this correction to each other which may be useful when the PAUTs 50 are not in the ideal range of positions to pipe wall in OOR cases. As such, the module 70 provides a greater tolerance for the sensing module 70 to be out-of-center relative to the pipe as the device 80 traverses the pipeline while still collecting good data.

Figure 13:
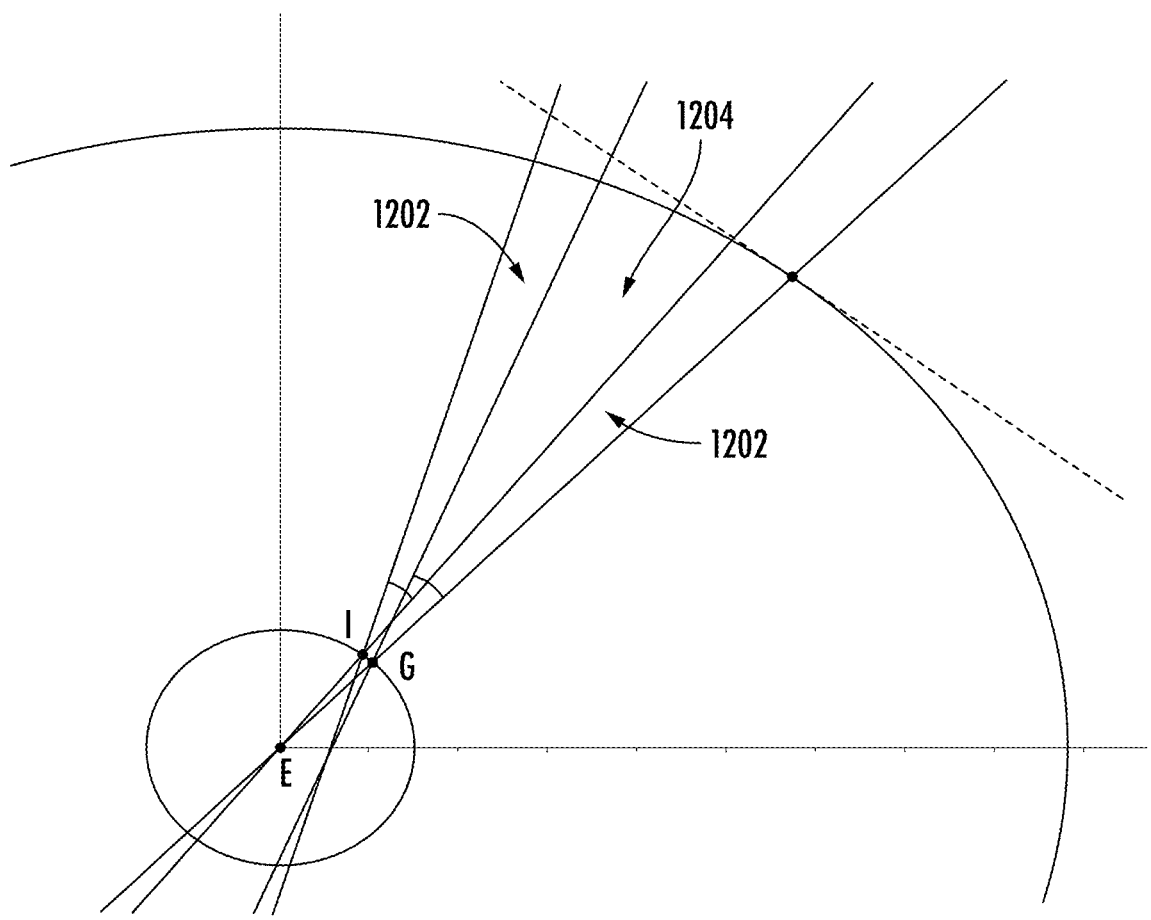
FIG. 13 is a diagram of beam coverage overlap between two adjacent PAUTs, according to an embodiment.

In the example of FIG. 13, two PAUTs 50 at points G and I are used to scan a pipe wall. Alpha refers to the steered angle at the point. The 15" sensing body of the device 80 remains a substantial circumferential profile. The highlighted areas 1202 represent sweep area by two PAUT 50. The circumferential scanning points are discrete on the pipe wall. In the overlapped sweep area 1204, the beams from two PAUTs 50 can be complementary to each other. The beam complementation improves circumferential resolution in the area and improves accuracy in identifying defects of the pipe wall.

Figure 14A:
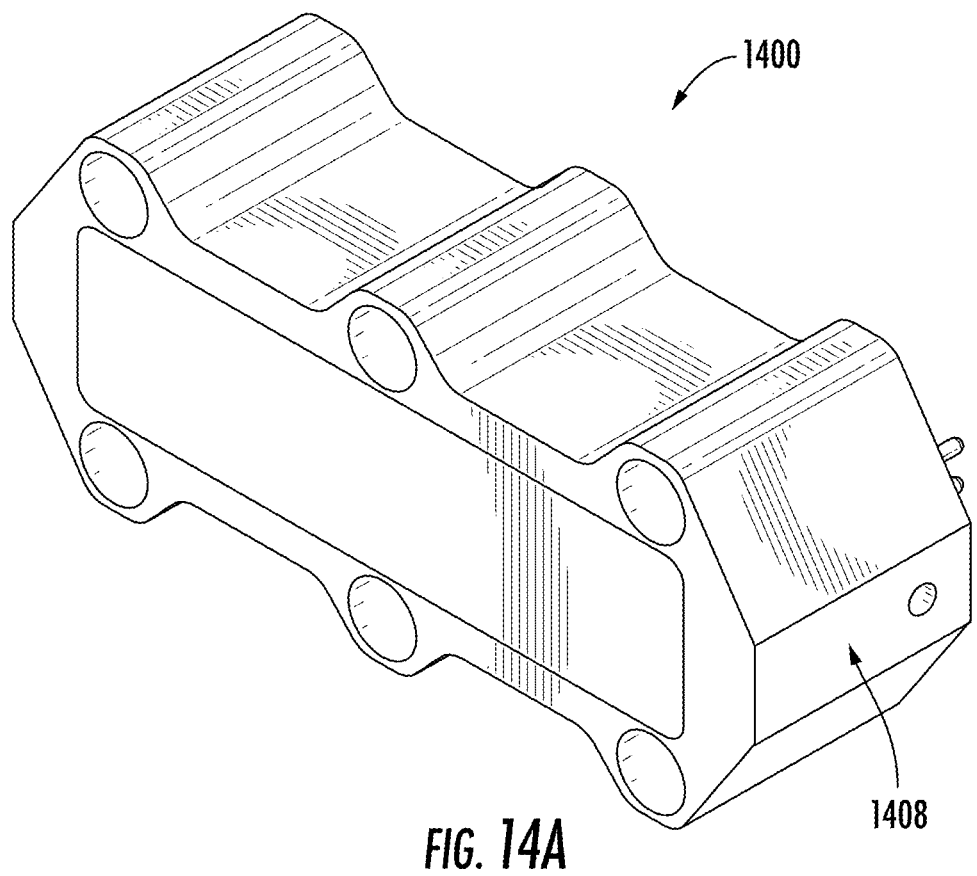
FIG. 14A is a front perspective view of an assembled and potted PAUT, according to another embodiment.
Figure 14B:
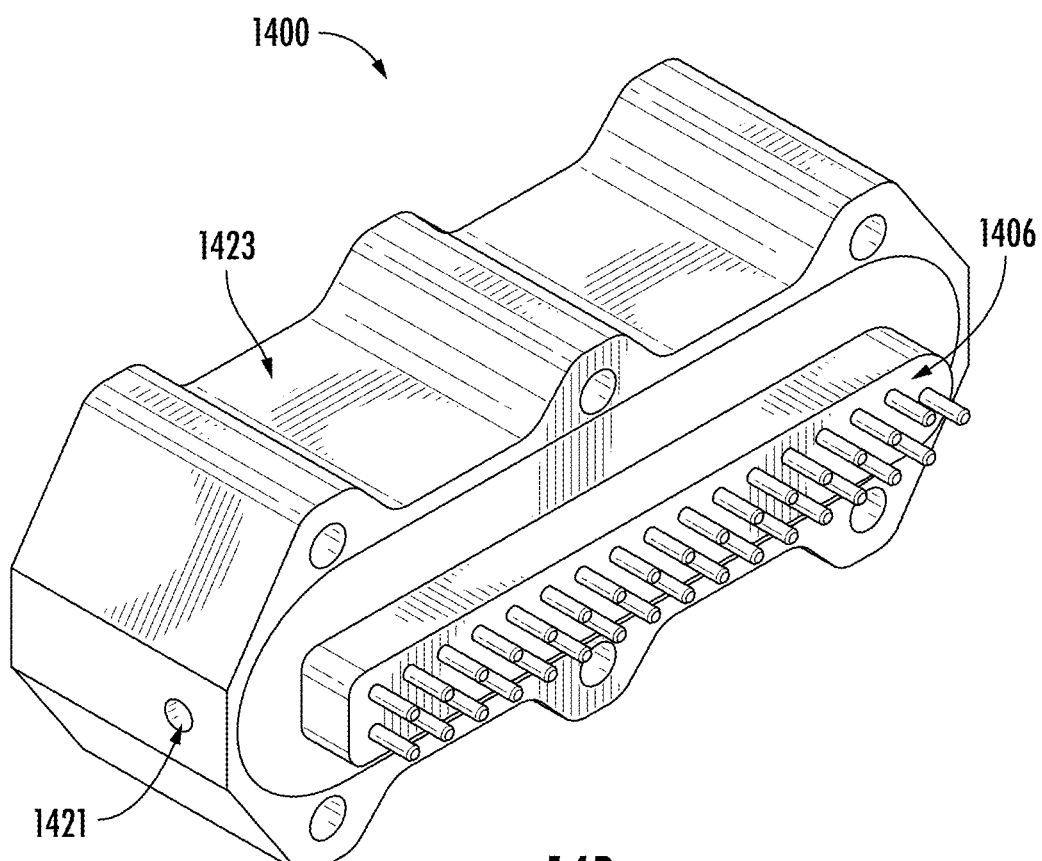
FIG. 14B is a rear perspective view of the PAUT in FIG. 14A.
Figure 15:
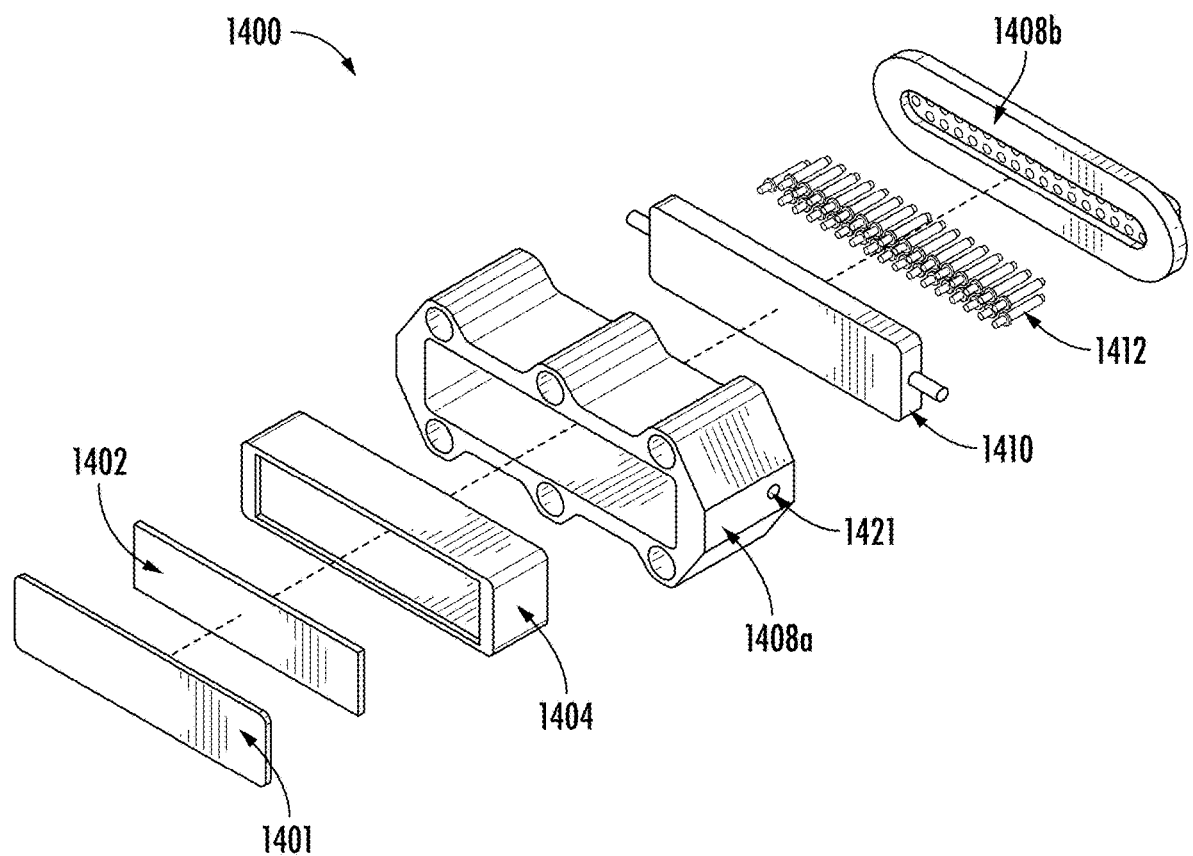
FIG. 15 is an exploded view of the PAUT in FIG. 14A.

FIGS. 14A-14B and 15 illustrate another embodiment of a PAUT 1400. As illustrated in FIG. 15. PAUT 1400 may include a matching layer 1401, a sensor 1402, a backing layer 1404, and a housing 1408 including an outer shell 1408a and a back shell 1408b. The sensor 1402 is configured to generate multi-channel ultrasonic wave signals. For example, the sensor 1402 may be a 2.25 MHz, 32 channels, 12×48 mm PZT. The PAUT 1400 may also include a potting 1410, and connector pins 1412, such as 33 male connector pins to form a connector 1406. The connector pins are configured to be electrically coupled to the sensor 1402. The PAUT sensor 1400 has the same components and functions as the PAUT 50 in the FIG. 5 as described above, except that in the example of FIG. 14, the PAUT 1400 uses a connector including pins and socket connector, rather than a cable in PAUT 50.

In the example of PAUT 1400, the piezo ceramic aperture 1402 is larger than that in PAUT 50 to increase the sensing area. The PAUT 1400 may also include more channels than PAUT 50 so the pass-through cable in PAUT 50 is replaced with a pin and socket connector 1406 bulkhead to eliminate the need for a thicker pass-through cable. The advantage of PAUT 1400 is the ease of serviceability in terms of being able to switch out PAUTs 1400 without opening the sensing module to disconnect the cable internally. The bulkhead connector 1406 also provides another barrier for water intrusion into the sensing module thus improving the robustness of the overall design. The two shells 1408a and 1408b aid in the ease of assembly and reduction in gas trapped in the potting material which can compromise acoustic performance and watertightness. The outer shell 1408a has one injection hole 1421 for potting 1410 and another hole on the opposite end for air bleeding. During the last step of the assembly PAUT 1400, the assembly PAUT 1400 is stood vertically on its end and the back shell epoxy material is injected from the bottom and fills up to the top expelling all the gas in the interior cavity. In PAUT 1400, the shell material is made from a plastic, such as PEEK. This is for the mechanical strength, epoxy bonding strength, similar thermal expansion rates as epoxy, and for weight reduction considerations.

The PAUT 1400 may also include one or more air bleed cutouts 1423 as potential grabbing points when the PAUT 1400 is assembled or dissembled from a sensing module. In the example of FIGS. 14A-15, the PAUT 1400 has substantially a rectangular profile. The PAUT 1400 may also have other shapes.

Figure 16A:
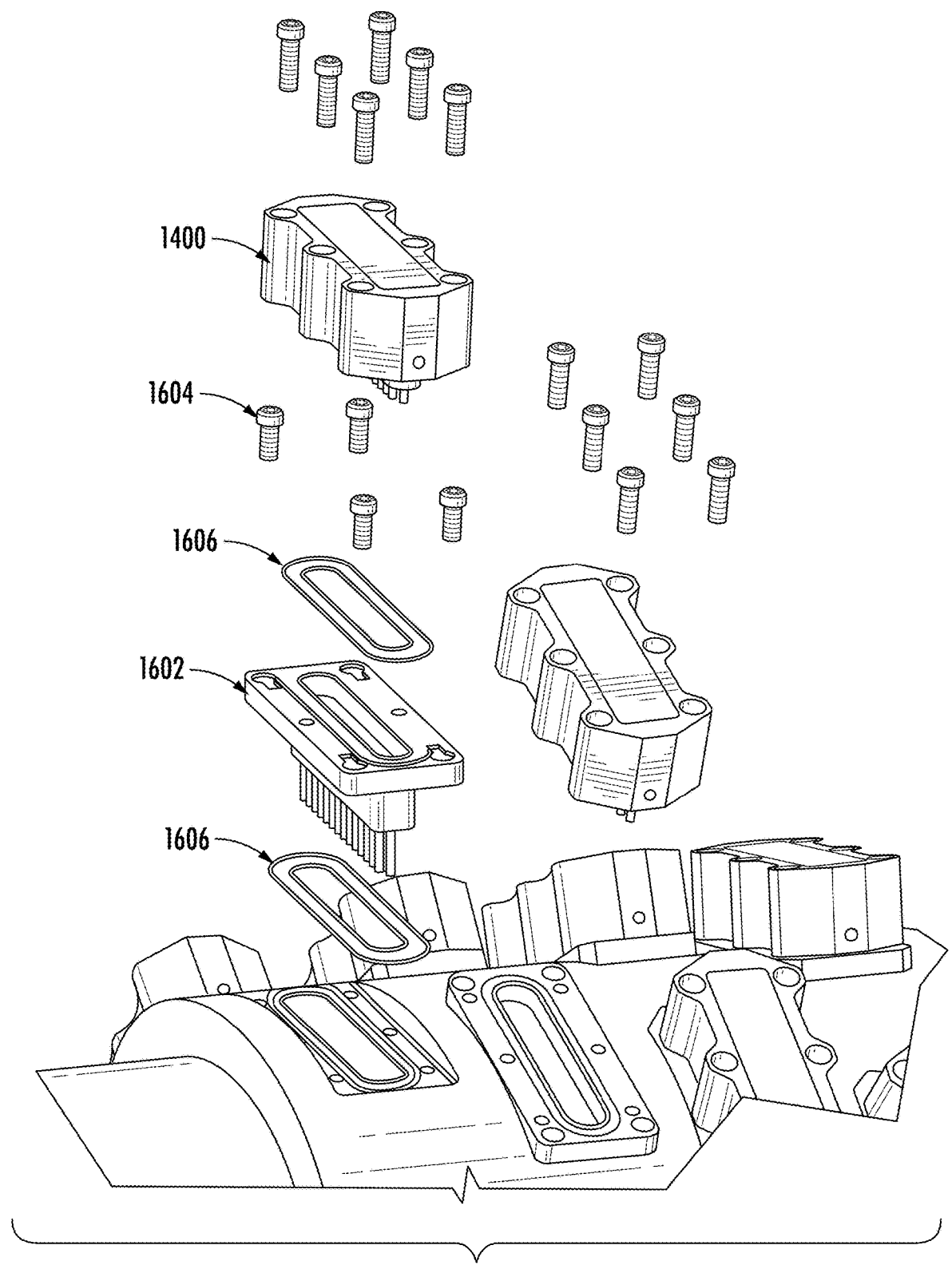
FIG. 16A is an exploded view of mounting the PAUT in FIG. 14A to a sensing module, according to an embodiment.
Figure 16B:
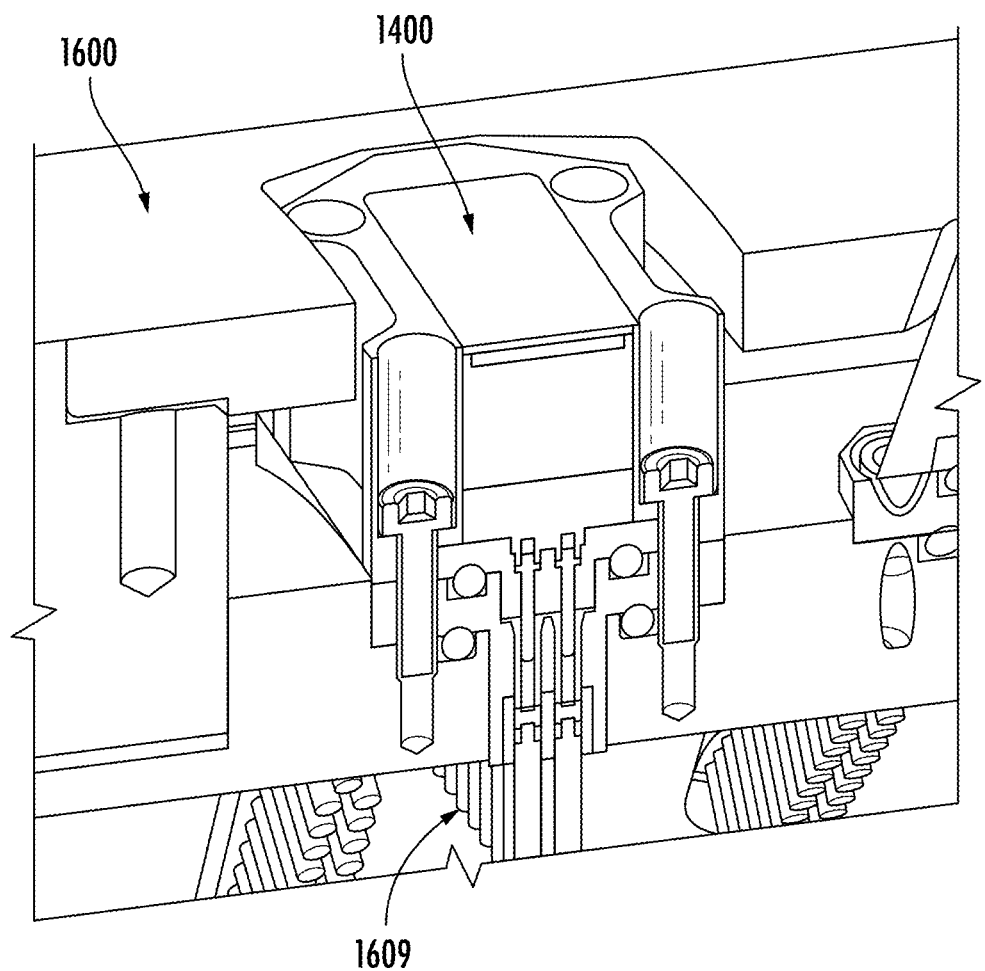
FIG. 16B is a cross sectional view of the sensing module in FIG. 16A.

FIGS. 16A-16B illustrate mounting a PAUT 1400 onto the sensing module 1600. In the example of FIG. 16A, a removable watertight socket 1602 bulkhead is attached to the sensing module 1600 with fasteners 1604, such as screws. This bulkhead has an epoxy potted back end and O-ring seal 1606 to aid in watertightness. The PAUT 1400 is mounted onto the bulkhead 1602 with the fasteners passing through the bulkhead to fasten directly onto the module 1600 to clamp the entire PAUT 1400 down to secure the seal. The connector 1406 is configured to connect to sensor connector 1609 to connect the sensor 1402 to memory modules and PCBs of the sensing module 1600. The PAUTs 1400 in the examples of FIGS. 14A-16 are similarly connected to one or more memory modules and the PCBs in the same way as the PAUT 50 in the example of FIGS. 7A and 7B. The sensing module 1600 can be assembled in the same manner as the sensing module 60.

Figure 17:
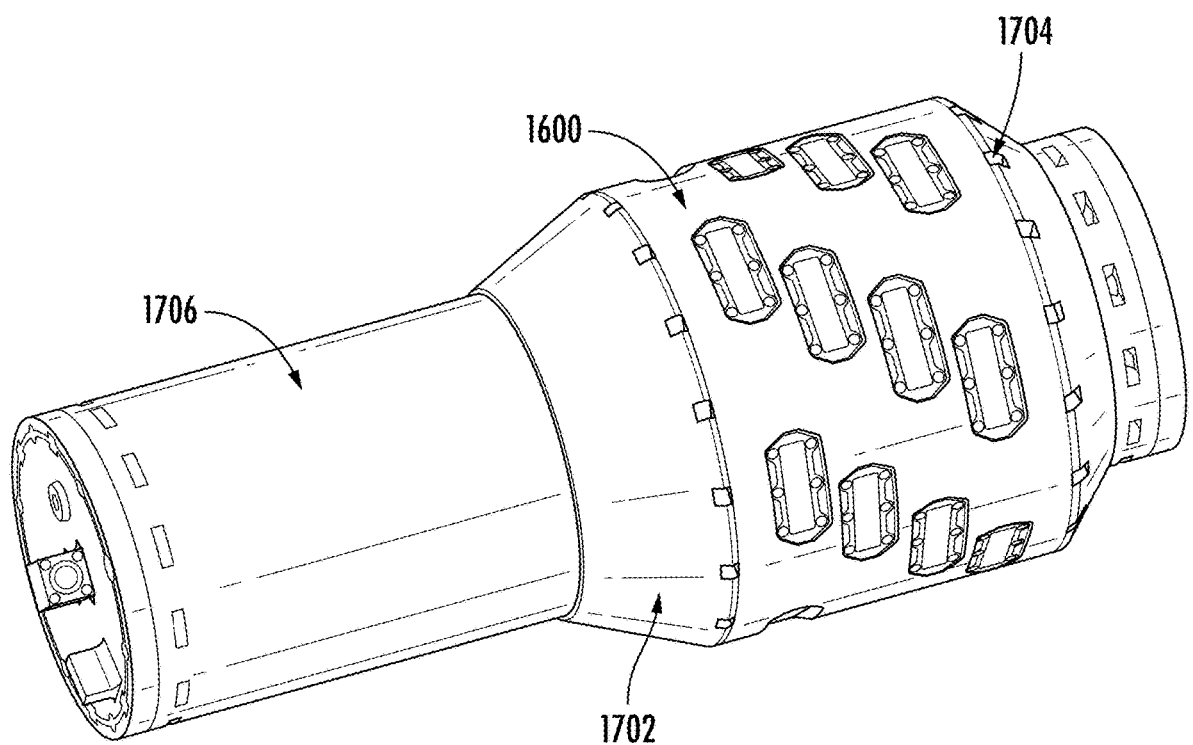
FIG. 17 is a perspective view of an exemplary assembled sensing module with the PAUT in FIG. 14A mounted, according to another embodiment.

FIG. 17 is an exemplary assembled sensing module 1600 with the PAUTs 1400 mounted on the module 1600. For example, the PAUTs 1400 can be substantially evenly spaced around the module 1600. The guard 1702 is configured to protect the PAUTs 1400 from impact and abrasion against the pipe wall and pipe features as the device traverses the pipeline. The guard 1702 may be made from plastic. The air bleed holes 1704 aid in balancing the device accurately in the same manner as described in the example of FIG. 7A in open water prior to insertion to achieve optimal centering performance for the inspection. The sensing module 1600 may also include a connector 1706, which can be an LDPD module with 10" diameter, for electrically connecting the sensing module 1600 to the other modules of an inspection device.

Figure 18:
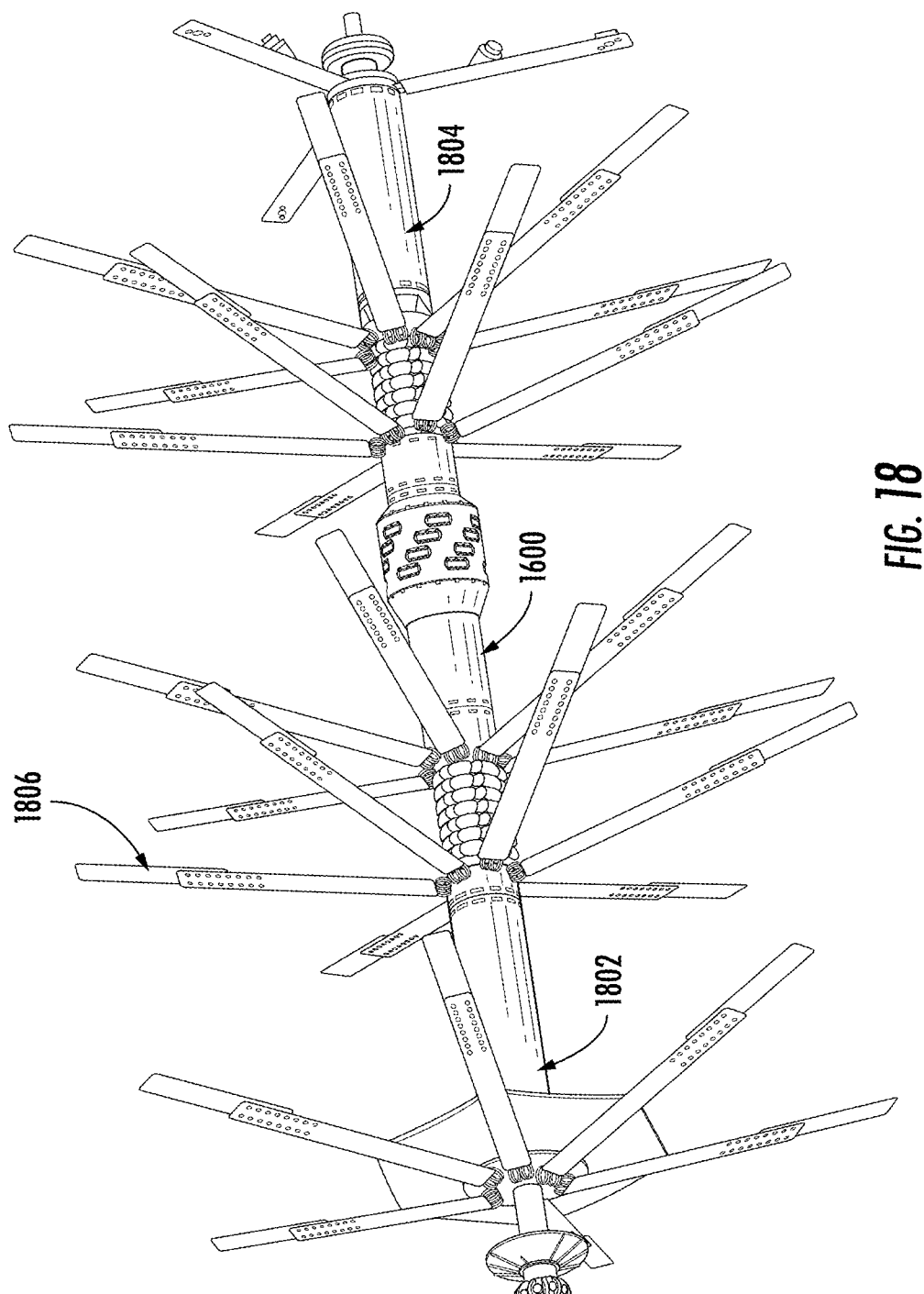
FIG. 18 is a side perspective view of device for pipe condition assessment device with the sensing module of FIG. 17, according to another embodiment.

FIG. 18 illustrates an example of an inspection device 1800 for pipeline condition assessment. The device 1800 includes a sensing module 1600 mounted on the condition assessment device 1800, a first battery module 1802 followed by the sensing module 1600, and a second battery module 1804 with additional sensing equipment. The additional sensing equipment may be an image or video sensor for collecting image or video data of the pipe condition, and may be used in the sensing module 1600 or all the previously described modules. Similar to device 80, the device 1800 may also include more or fewer battery modules for additional runtime and device stability in larger pipes, such a three or more battery modules. Due to the modular nature of the device 1800, the sensing module 1600 can be placed anywhere along the device 1800. In some examples, the sensing module 1600 can be placed in the center of the supporting petal structure 1806 to maintain optimal centering performance. The device 1800 may have the same supporting structure as device 80 as described above.

Another example to overcome the OOR issue identified with single element transducers is to use a larger single element piezo ceramic aperture to increase the sensing area and to bring the transducer closer to the pipe wall to reduce the offset effect of the reflected angle in OOR pipes.

Figure 19A:
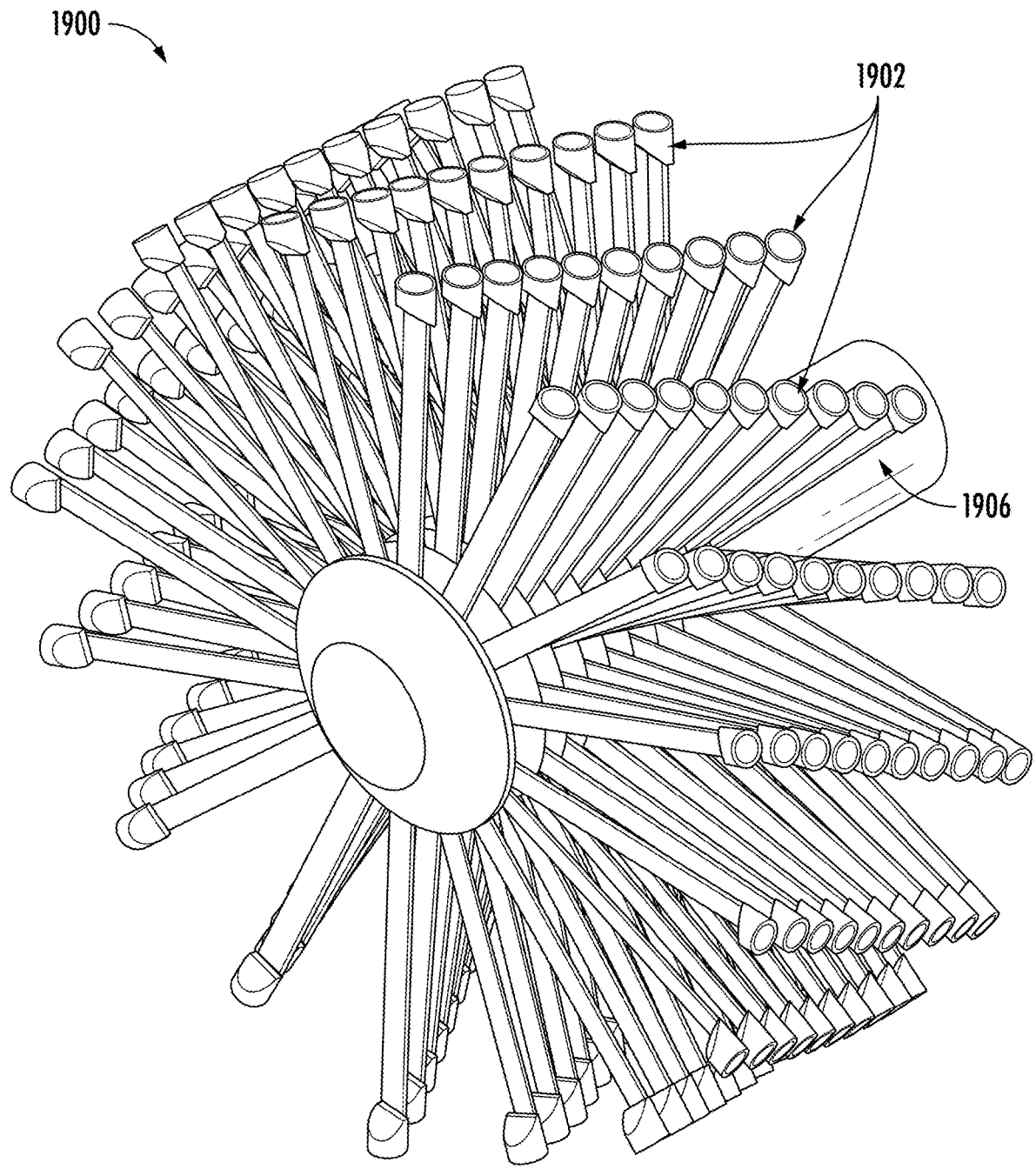
FIG. 19A is a perspective view of a sensing module, according to another embodiment.
Figure 19B:
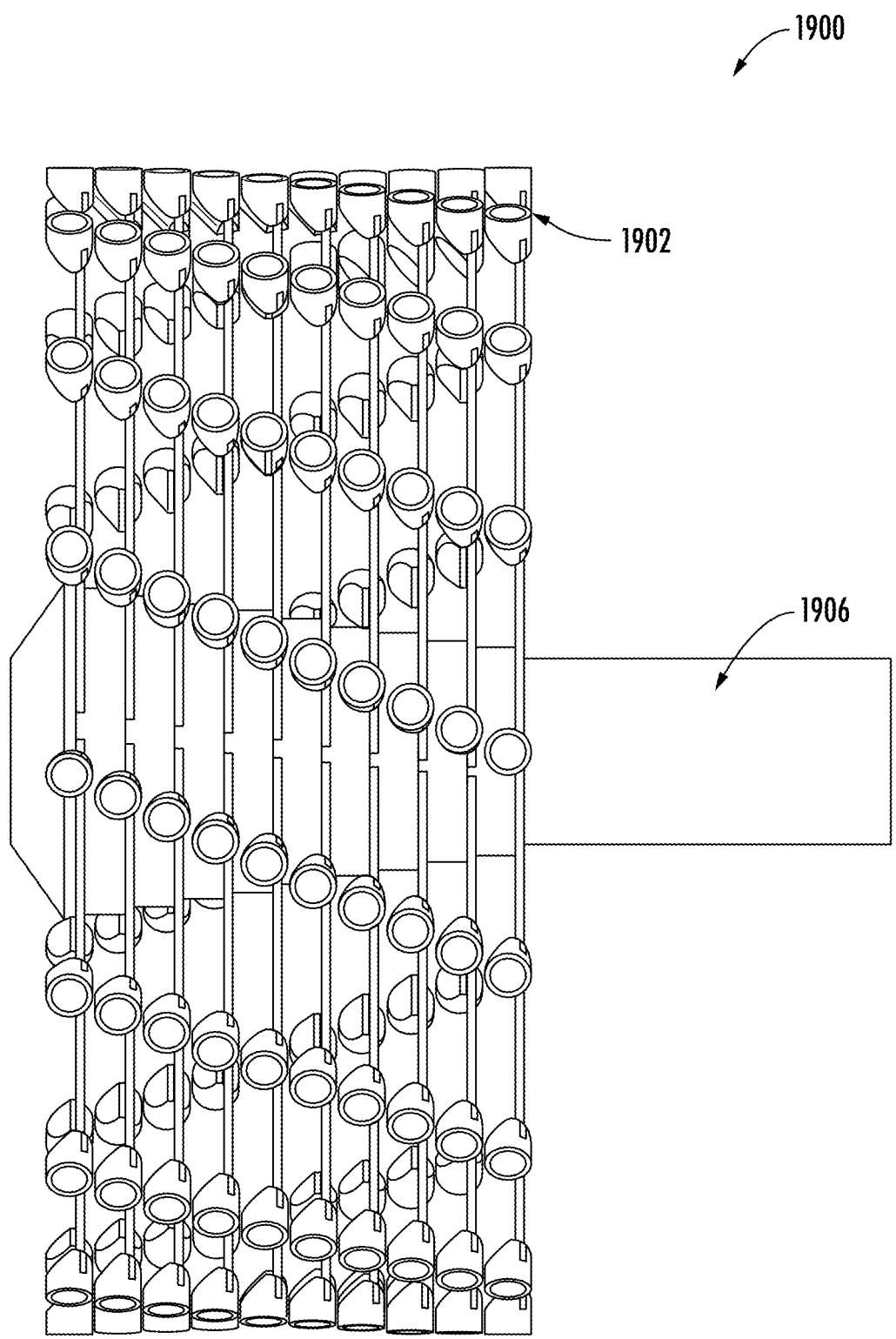
FIG. 19B is a side perspective view of the sensing module of FIG. 19A, according to another embodiment.

In the example sensing module 1900 shown in FIGS. 19A and 19B, the single element transducer 1902 may be mounted onto the end of petal arms 1904 that deploy in the fully open position when the sensing module 1900 is centered in the pipe. The petal arms 1904 may be pre-loaded by spring. The sensing module 1900 is configured such that when the pre-loaded spring arms that deploy in the fully open position, each transducer 1902 is equally spaced around the circumference of the pipe but are axially shifted in groups. Such configuration allows the sensing module 1900 to collapse fully when passing through pipe features such as in-line valves and manways. Each transducer 1902 is configured to emit an ultrasonic wave for scanning a pipe wall of the pipe. The ultrasonic wave emitted from each transducer 1902 is configured to overlap at least a portion of an ultrasonic wave emitted from an adjacent second transducer 1902 at the pipe wall.

The structure of the single element transducer 1902 is similar to the PAUT 50 in FIG. 4. Unlike the PAUT 50 in FIG. 4, which has a multi-channel piezo ceramic sensor 54, the single element transducer 1902 has one channel. The single element transducer 1902 may be mounted to the petal arm 1904 by fasteners, such as by being screwed into the arm 1904. The single element transducers 1904 may be connected to a module assembly which has the drive electronics and data acquisition in the housing 1906, in the same manner as sensing module 60 and 1600. The module assembly has circuits similar to daughter board 74A and main board 74B configured for generating phased ultrasonic signal waves as described above, and receiving the signal waves reflected from the wall of the pipeline.

Figure 20A:
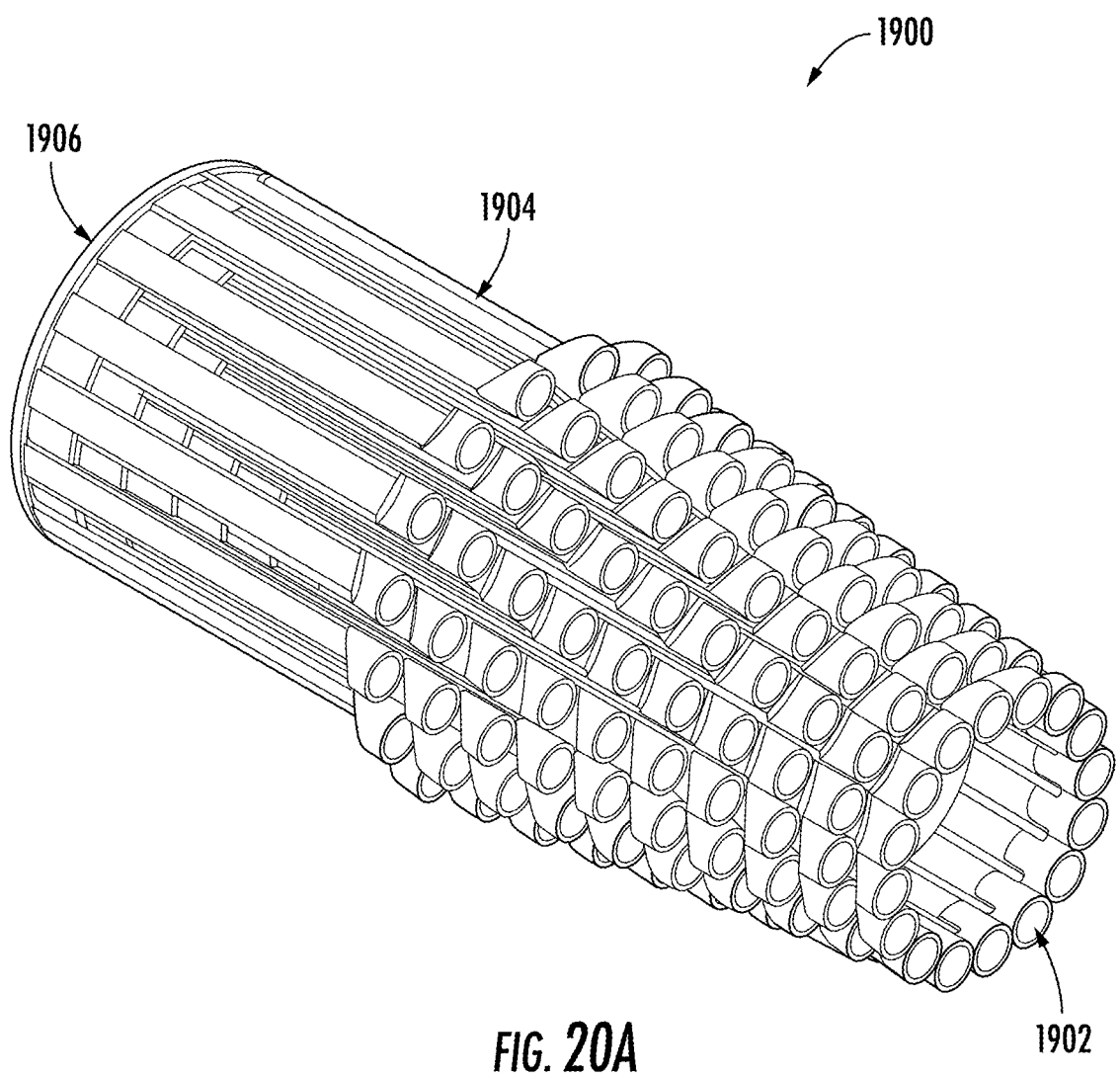
FIG. 20A is a side perspective view of the sensing module of FIG. 19A with arms collapsed to pass features of a pipe, according to another embodiment.
Figure 20B:
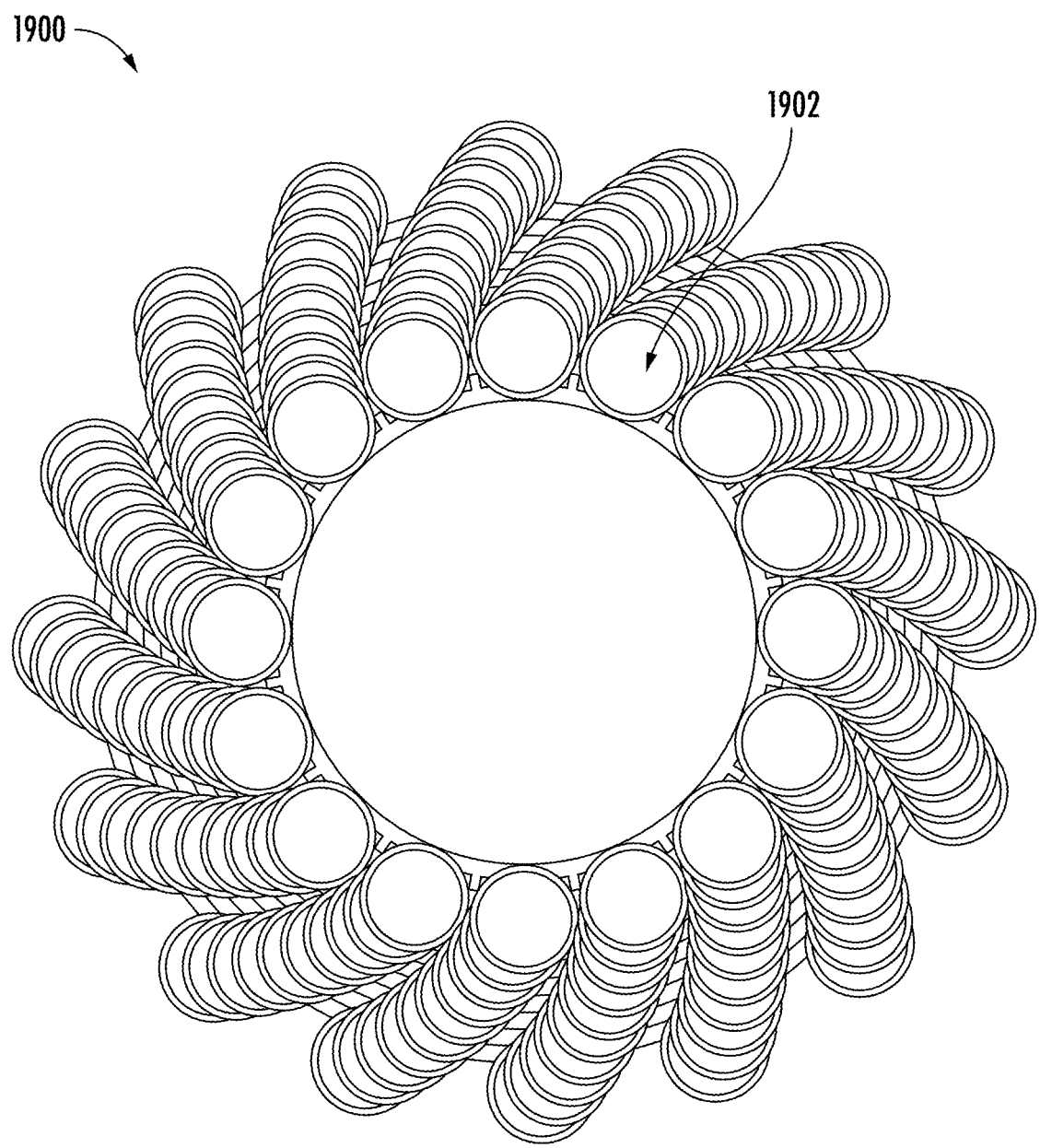
FIG. 20B is a front perspective view of the sensing module of FIG. 20A, according to another embodiment.

In the example of FIGS. 20A and 20B, when the front arms 1904 encounter a feature in the pipe, the arms 1904 push the adjacent arms 1904 behind down and so on in a manner that allows all the transducers 1902 in the group to nest in a compact formation against the sensing module 1900. After passing the feature, the springs would passively deploy all the arms 1904 in the group back to the normal position to resume scanning.

Although sensing module 1900 is feasible in solving the OOR issue, the use of transducers 1902 on a fixed sensing module reduces the need for mechanical complexity and potentially reliability issues associated with additional moving parts. Sensing module 1900 is also as easily scalable as the fixed PAUT concept as the sensing module is more reliant on the mechanical structure to solve the OOR challenge for various sized pipes.

Figure 21:
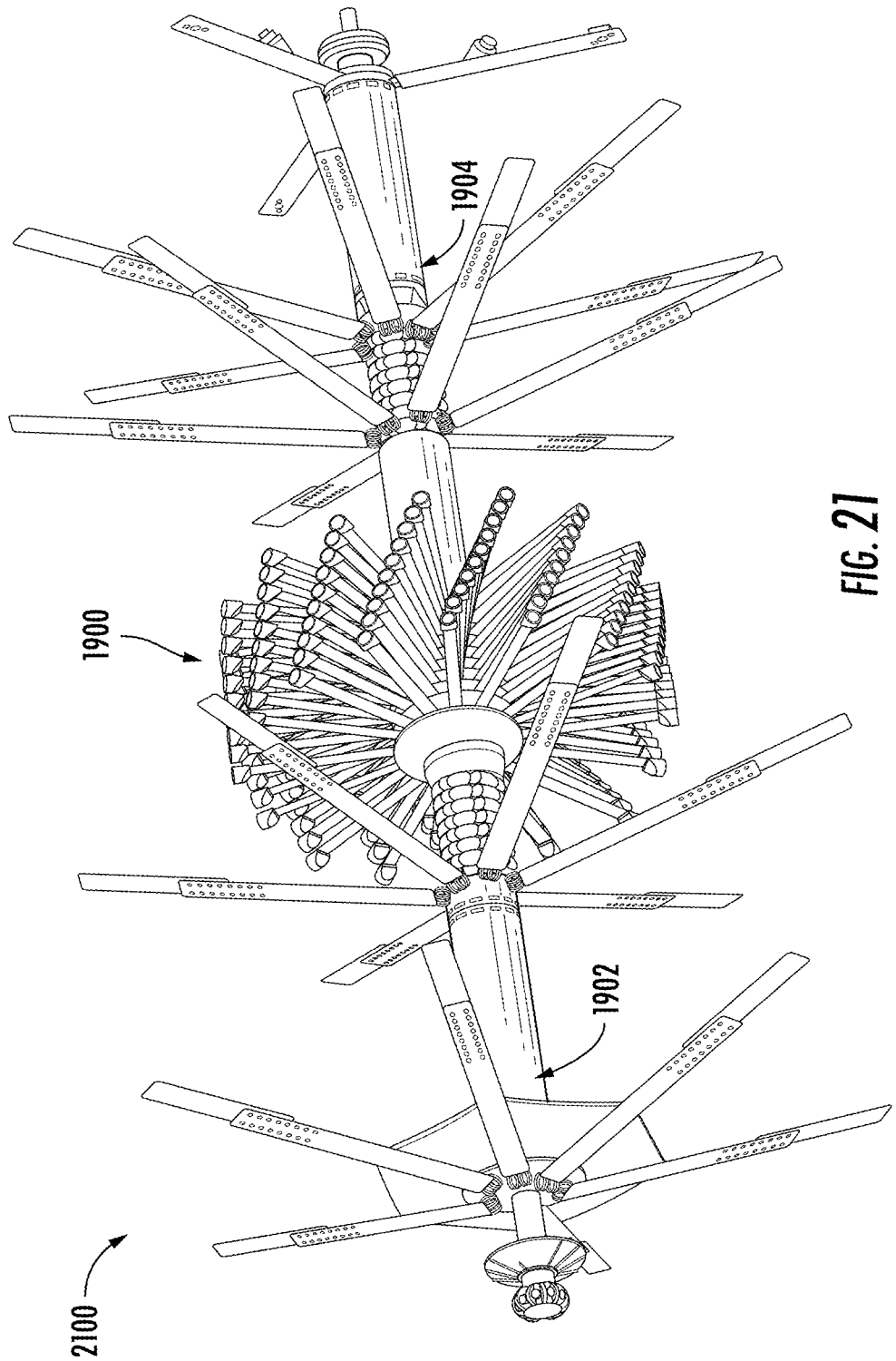
FIG. 21 is a side perspective view of a device for pipeline condition assessment with the sensing module of FIG. 19A, according to another embodiment.

FIG. 21 illustrates an example of an inspection device 2100 for assessing condition of a pipeline. The device 2100 includes a sensing module 1900 mounted into the condition assessment device 2100, a first battery module 1902 followed by the sensing module 1900, and a second battery module 1904 with additional sensing equipment. The additional sensing equipment may be an image or video sensor for collecting image or video data of the pipe condition, and may be used in the sensing module 1900 or all the previously described modules. Similar to devices 80, 1800, device 2100 may also include more or fewer battery modules for additional runtime and device stability in larger pipes, such as three or more battery modules.

This apparatus can be used in condition assessment of a metallic pipeline of interest. This may be a potable water, raw water or wastewater pipeline ranging in diameters 14 in and above. The inspection device is inserted into the pipeline though an existing pipeline feature such as a lateral, risers of access manways under a pressurized or unpressurized condition. The flexible pipeline inspection device is carried by the liquid in the pipeline to assess the condition of the walls of the pipeline. The flexibility of the device allows the device to navigate inline features such as valves, bends, wyes and tees.

This apparatus is ease of use to inspect existing infrastructure with little to no modifications required for inspection, for live condition assessment for large diameter metallic water or wastewater pipelines. This apparatus may be the first condition assessment device for water and wastewater pipelines utilizing PAUTs.

Certain adaptations and modifications of the described embodiments can be made. Therefore, the above discussed embodiments are considered to be illustrative and not restrictive.

What is claimed is:

1. A sensing module for assessing pipeline condition, comprising:
   a body; and
   one or more phased array ultrasonic transducers (PAUTs) assembled on a surface of the body, each PAUT configured to emit multi-channel ultrasonic waves for scanning a pipe wall, wherein at least one of the one or more PAUTs comprises:
   a matching layer;
   a backing layer;
   a sensor placed between the matching layer and the backing layer for generating the multi-channel ultrasonic waves; and a housing that receives the matching layer, the backing layer and the sensor therein such that the matching layer does not extend on an outside surface of the housing.

2. The sensing module of claim 1, wherein
the housing comprises an outer shell; and
a back shell removably connected to the outer shell for water tightly enclosing the sensor and the matching layer and the backing layer within the outer shell and the back shell.

3. The sensing module of claim 2, wherein the at least one or the one or more PAUTs comprises:
an O-ring between the back shell and the outer shell.

4. The sensing module of claim 2, wherein the back shell and the outer are made from plastic.

5. The sensing module of claim 4, wherein the plastic comprises polyetheretherketone (PEEK).

6. The sensing module of claim 1, wherein the ultrasonic waves generated by at least one of the one or more PAUTs at least partially overlaps on the pipe wall with the ultrasonic waves generated by an adjacent PAUT.

7. The sensing module of claim 1, wherein the body comprises a guard including one or more watertight sockets, and wherein each socket is configured to receive one PAUT.

8. The sensing module of claim 1, wherein the body comprises a plurality of air bleed holes.

9. The sensing module of claim 1, wherein each of the one or more PAUTs comprises a cable and connector for connecting the each of one or more PAUTs to a sensing sensor.

10. The sensing module of claim 1, wherein each of the one or more PAUTs comprises a connector for connecting each of one or more PAUTs to a sensing sensor.

11. The sensing module of claim 1, further comprising circuits for collecting voltage, current, humidity, pressure and Internal Measurement data of the sensing module.

12. The sensing module of claim 1, further comprising a removeable data storage medium.

13. The sensing module of claim 1, wherein the pipe wall is an out-of-round (OOR) pipe wall.

14. The sensing module of claim 1, wherein the sensor is a multi-channel piezo ceramic sensor.

15. The sensing module of claim 1, wherein the one or more PAUTs are equally space on the body.

16. A sensing module for assessing pipeline condition, comprising:
a plurality of pre-loaded spring arms; and
a transducer mounted at an end of each of the plurality of pre-loaded spring arms that deploy in a fully open position when the sensing module is centered in a pipe, wherein each transducer is configured emit an ultrasonic wave for scanning a pipe wall of the pipe, and wherein a first ultrasonic wave emitted from a first transducer is configured to overlap at least a portion of a second ultrasonic wave emitted from an adjacent second transducer.

17. The sensing module of claim 16, wherein the each transducer is configured to equally spaced around a circumference of the pipe and are axially shifted.

18. The sensing module of claim 16, wherein the sensing module is configured to collapse when the sensing module passes through a pipe feature.

19. A device for assessing pipeline condition, comprising:
a sensing module for assessing pipeline condition, comprising:
a body; and
one or more phased array ultrasonic transducers (PAUTs) assembled on a surface of the body, each PAUT configured to emit multi-channel ultrasonic waves for scanning a pipe wall;
one or more battery modules for powering the sensing module; and
one or more sets of supporting structure for maintaining the sensing module at a center of the pipe, wherein at least one of the one or more PAUTs comprises:
a matching layer;
a backing layer;
a sensor placed between the matching layer and the backing layer for generating the multi-channel ultrasonic waves; and
a housing that receives the matching layer, the backing layer and the sensor therein such that the matching layer does not extend on an outside surface of the housing.

20. The device of claim 19, wherein each of the one or more sets of supporting structure comprises a plurality of pre-loaded spring supporting petals.

* * * * *